(12) United States Patent
Hui et al.

(10) Patent No.: US 8,649,453 B2
(45) Date of Patent: Feb. 11, 2014

(54) ENHANCED METRICS FOR DEMODULATION AND SOFT INFORMATION GENERATION IN THE PRESENCE OF A NON-CONSTANT ENVELOPE MODULATED INTERFERER

(75) Inventors: Dennis Hui, Sunnyvale, CA (US); Ali S. Khayrallah, Mountain View, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/434,955

(22) Filed: Mar. 30, 2012

(65) Prior Publication Data
US 2013/0259164 A1    Oct. 3, 2013

(51) Int. Cl.
*H04K 1/10*    (2006.01)

(52) U.S. Cl.
USPC ........... 375/260; 375/148; 375/340; 708/300; 455/509; 455/522

(58) Field of Classification Search
None
See application file for complete search history.

(56) References Cited

U.S. PATENT DOCUMENTS 6,975,582 B1 * 12/2005 Karabinis et al. ............. 370/204
7,088,978 B2    8/2006 Hui et al.
8,081,929 B2 * 12/2011 Ibrahim et al. ............. 455/67.11

OTHER PUBLICATIONS

Hui, D. et al., "Maximum likelihood sequence estimation in the presence of constant envelope interference," Vehicular Technology Conference, vol. 2, Oct. 2003, pp. 1060-1064.
Gradshteyn, I. S. et al., "Table of Integrals Series and Products," edited by Alan Jeffery, 5th Edition, Academic Press, 1980, pp. 961.

* cited by examiner

*Primary Examiner* — Adolf Dsouza
(74) *Attorney, Agent, or Firm* — Withrow & Terranova, PLLC

(57) ABSTRACT

Systems and methods utilize enhanced metrics for demodulation and/or soft bit information generation in the presence of a non-constant envelope modulated interfering signal. In one embodiment, a receiver includes a downconverter and a demodulator. The downconverter receives a radio frequency signal comprising a desired signal, noise, and a non-constant envelope modulated interfering signal, and downconverts the radio frequency signal to provide a downconverted signal. The demodulator demodulates the downconverted signal based on a demodulation metric that models the non-constant envelope modulated interfering signal as a stationary non-Gaussian random process with a probability distribution derived from a modulation constellation of a modulation used for the non-constant envelope modulated interfering signal. In one embodiment, the demodulator outputs demodulated symbols. In another embodiment, the demodulator outputs soft bit information.

20 Claims, 12 Drawing Sheets

ENHANCED METRICS FOR DEMODULATION AND SOFT INFORMATION GENERATION IN THE PRESENCE OF A NON-CONSTANT ENVELOPE MODULATED INTERFERER

FIELD OF THE DISCLOSURE

The present disclosure relates to a receiver in a wireless network and more particularly relates to demodulation of a received signal.

BACKGROUND

To cope with the phenomenal growth in wireless data traffic, scarce radio resources are being aggressively reused in cellular communication networks. Mutual interference among users occupying the same radio channel has thus become a major performance impediment in cellular communications. Conventional wireless receiver designs focus on combating background thermal noise to improve receiver sensitivity and typically model co-channel interference in a similar fashion as the thermal noise based on a Gaussian probability distribution. However, since the number of significant interferers in a cellular communication network is typically quite small, the statistics of co-channel interference can be rather different from the Gaussian probability distribution. As a result, the performance of conventional receivers is often far from the optimum achievable in interference-limited situations. Improved wireless receiver designs that can better exploit the interference statistics are therefore desirable.

More specifically, in conventional wireless receivers, the interference and the thermal noise are typically modeled collectively as colored Gaussian noise. This leads to the use of a demodulation metric that depends only on second-order statistics of the interference. For instance, a conventional baseband model of a desired signal received at a wireless receiver equipped with one or more receive antennas is:

$$r = \overline{H}Ps + v = Hs + v,$$

where $r = (r_1, r_2, \ldots, r_{n_R})$ denotes a signal vector for a particular channel use (e.g., for a particular subcarrier in a particular time slot in an Orthogonal Frequency Division Multiplexing (OFDM) transmission) of a desired signal through $n_R$ receive antennas, $v$ denotes an impairment signal that includes both interference and thermal noise, $\overline{H}$ denotes a $n_R$-by-$n_T$ Multiple-Input-Multiple-Output (MIMO) channel matrix, P denotes a $n_T$-by-$n_S$ precoding matrix for mapping a symbol vector $s = [s_1, s_2, \ldots s_{n_S}]^T \in (\Lambda_D)^{n_S}$ of $n_S$ streams of desired information symbols into $n_T$ transmit antennas, $\Lambda_D$ denotes a set of constellation points in a modulation constellation of a modulation used for the desired signal, and H denotes an $n_R$-by-$n_S$ effective MIMO channel matrix. Traditionally, the impairment signal v is modeled as colored Gaussian noise with a probability distribution given by:

$$p_v(v_0) \equiv \frac{1}{\pi^{n_R} \det(R_v)} \exp\{-v_0^H R_v^{-1} v_0\},$$

where $R_v \equiv E[vv^H]$ denotes an covariance matrix of the impairment signal v, which is referred to herein as an impairment covariance matrix. This leads to the use of the conventional Euclidean-distance-based demodulation metric ($m_{conv}$) given by:

$$m_{conv}(s \mid r, R_v, H) \equiv -\ln p(r \mid s) \quad (1)$$
$$= -\ln p_v(r - Hs)$$
$$= (r - Hs)^H R_v^{-1}(r - Hs) + \ln \pi^{n_R} \det(R_v),$$

where the last term is independent of s and can be omitted. This metric can then be used to demodulate the symbol vector by computing:

$$s^* = \underset{s}{\operatorname{argmin}} m_{conv}(s \mid r, R, H) \underset{s}{\operatorname{argmin}} (r - Hs)^H R_v^{-1}(r - Hs).$$

The conventional metric ($m_{conv}$) in Equation (1) leads to the conventional formula for computing soft bit information for, say, the i-th bit of symbol $s_k$ given by:

$$\beta_{k,i}^{conv} \equiv \ln \frac{p(b_{k,i} = 1 \mid r)}{p(b_{k,i} = -1 \mid r)} \quad (2)$$

$$= \ln \frac{\sum_{s: b_{k,i}=1} p(r \mid s)}{\sum_{s: b_{k,i}=-1} p(r \mid s)} + \ln \frac{p(b_{k,i} = 1)}{p(b_{k,i} = -1)}$$

$$= \ln \sum_{s: b_{k,i}=1} \exp\{-m_{conv}(s \mid r, R_v, H)\} -$$

$$\ln \sum_{s: b_{k,i}=-1} \exp\{-m_{conv}(s \mid r, R_v, H)\} + \alpha_{k,i}$$

$$\approx \min_{s: b_{k,i}=-1} m_{conv}(s \mid r, R_v, H) -$$

$$\min_{s: b_{k,i}=1} m_{conv}(s \mid r, R_v, H) + \alpha_{k,i}$$

$$= \min_{s: b_{k,i}=-1} \{(r - Hs)^H R_v^{-1}(r - Hs)\} -$$

$$\min_{s: b_{k,i}=1} \{(r - Hs)^H R_v^{-1}(r - Hs)\} + \alpha_{k,i}$$

where $b_{k,i}$ denotes the i-th bit of the k-th symbol $s_k$ and $\alpha_{k,i} \equiv \ln [p(b_{k,i}=1)/p(b_{k,i}=-1)]$ denotes a priori information about the bit $b_{k,i}$, if available.

When the impairment signal v is dominated by a single interferer, the statistics of v can be far from Gaussian. In this case, the conventional demodulation metric ($m_{conv}$) defined by Equation (1) is not the best metric for demodulating transmitted symbols s, and Equation (2) is not the best formula for computing soft bit information. In D. Hui and R. Ramesh, "Maximum likelihood sequence estimation in the presence of constant envelope interference," *Proc. IEEE VTC-Fall*, 2003, a modified demodulation metric was introduced for the case when the dominant interferer employs a constant-envelope modulation such as the Gaussian Minimum Shift Keying (GMSK) modulation used in Global System for Mobile Communications (GSM) cellular networks. However, in the latest generations of cellular standards, such as High Speed Packet Access (HSPA) and Long Term Evolution (LTE), higher-order, non-constant-envelope modulation, such as Quadrature Amplitude Modulation (QAM), is used in order to achieve higher user throughput. As such, there is a need for an enhanced demodulation metric for demodulation in the presence of a non-constant envelope modulated interfering signal.

SUMMARY

Embodiments of a receiver are disclosed that utilize enhanced metrics for demodulation and soft bit information generation in the presence of a non-constant envelope modulated interfering signal. In general, the receiver includes a downconverter and a demodulator. The downconverter receives a radio frequency signal comprising a desired signal, noise, and a non-constant envelope modulated interfering signal, and downconverts the radio frequency signal to provide a downconverted signal. The demodulator demodulates the downconverted signal based on a demodulation metric that models the non-constant envelope modulated interfering signal as a stationary non-Gaussian random process with a probability distribution derived from a modulation constellation of a modulation used for the non-constant envelope modulated interfering signal. In one embodiment, the demodulator outputs demodulated symbols. In another embodiment, the demodulator outputs soft bit information.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
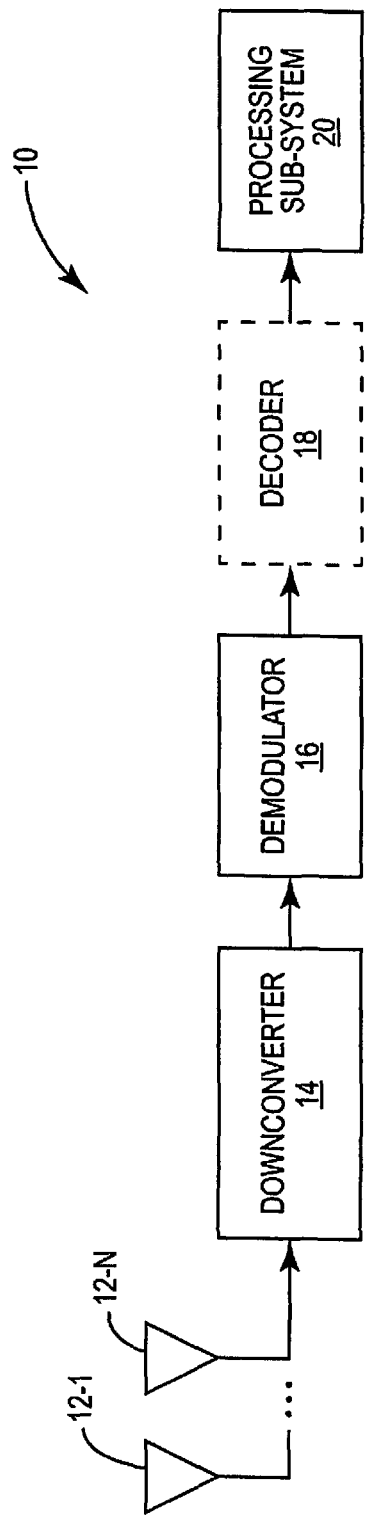
FIG. 1 is a block diagram of a receiver including a demodulator that models a non-constant envelope modulated interfering signal as a stationary non-Gaussian random process having a probability distribution derived based on a modulation constellation of a modulation used for the non-constant envelope modulated interfering signal according to one embodiment of the present disclosure.
Figure 5:
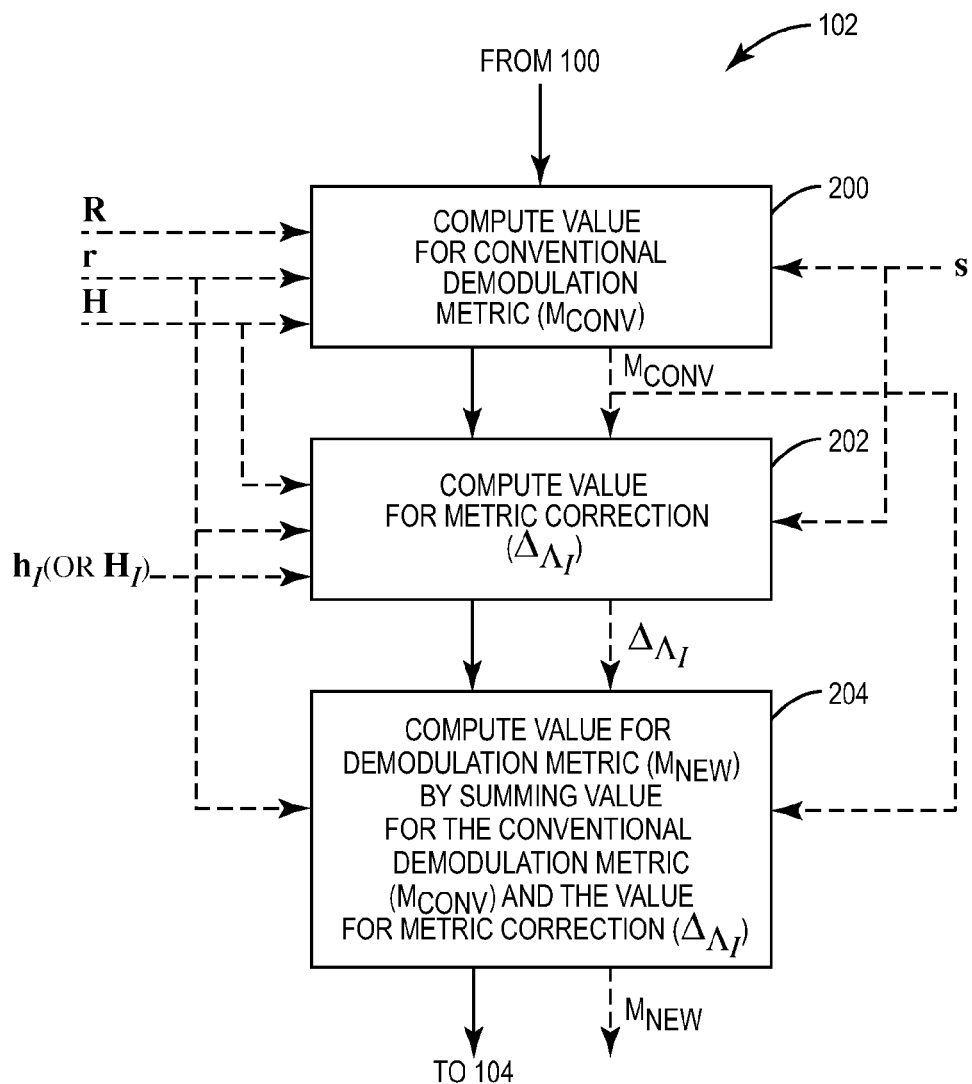
Figure 6:
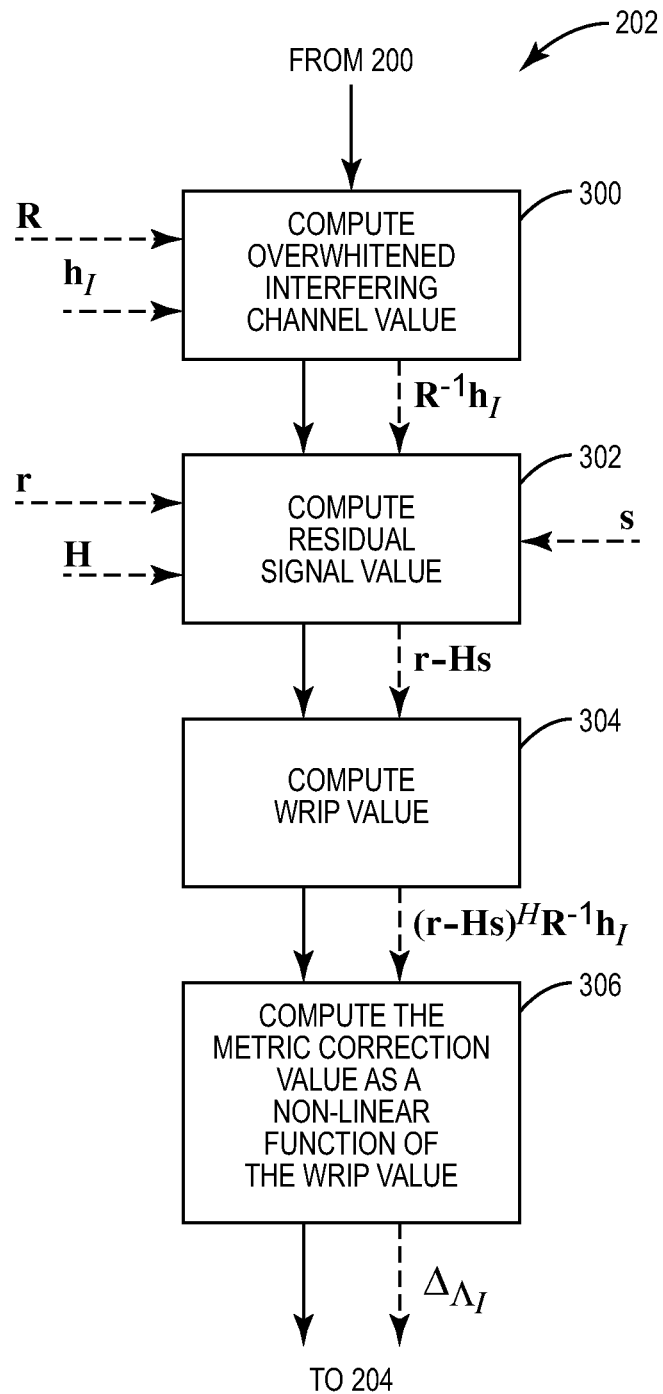
Figure 7:
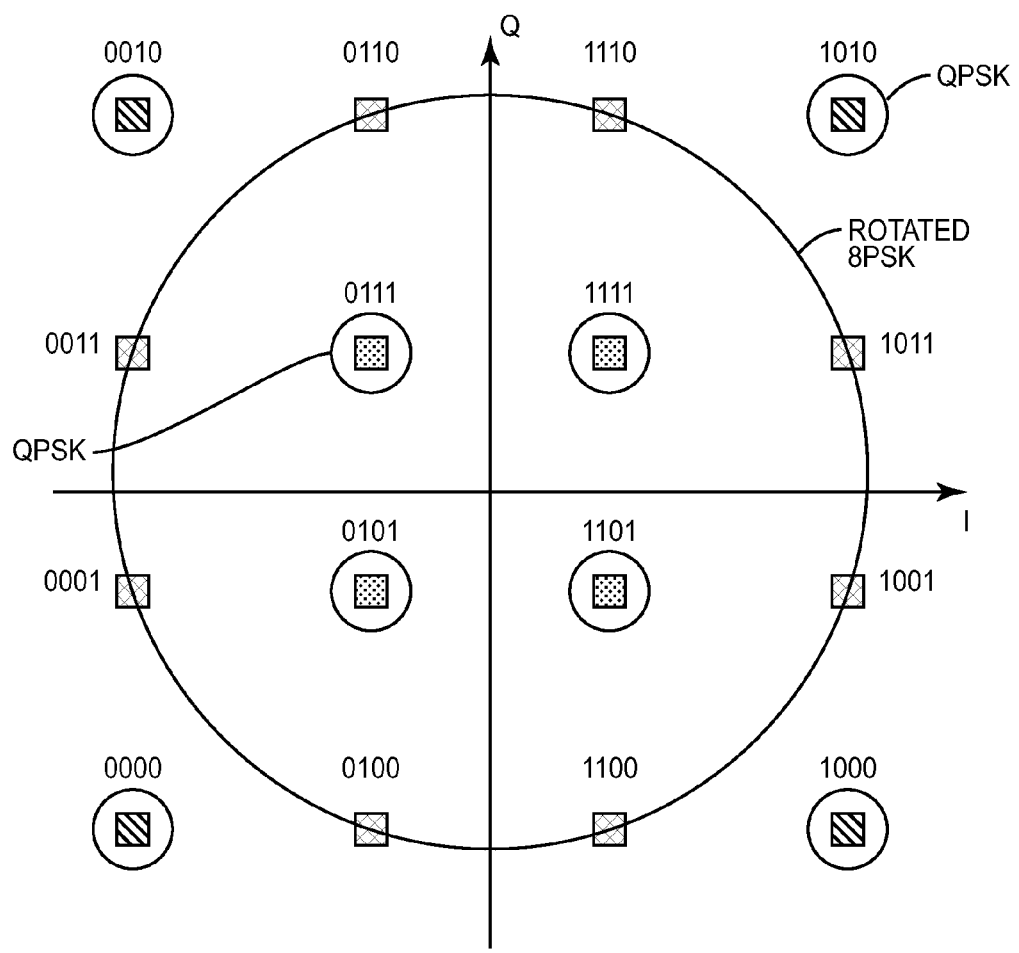
Figure 8:
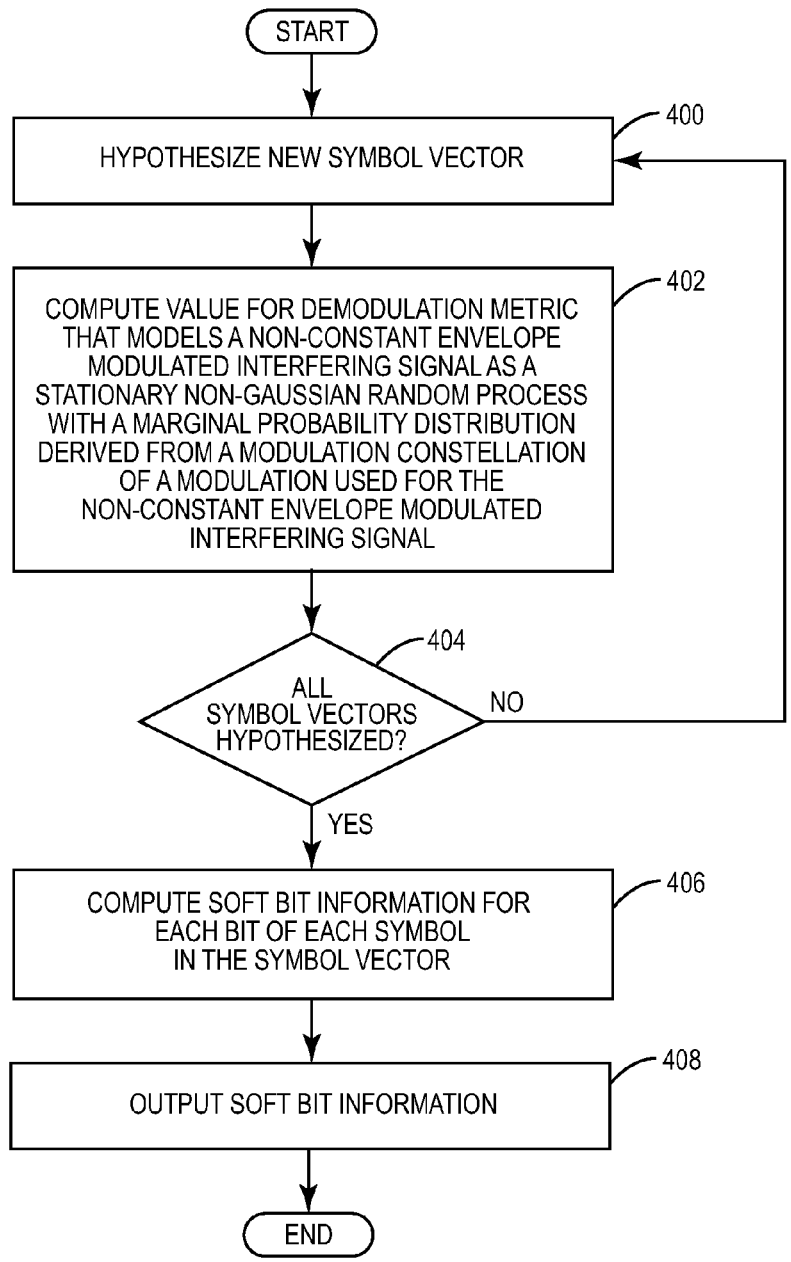
Figure 9:
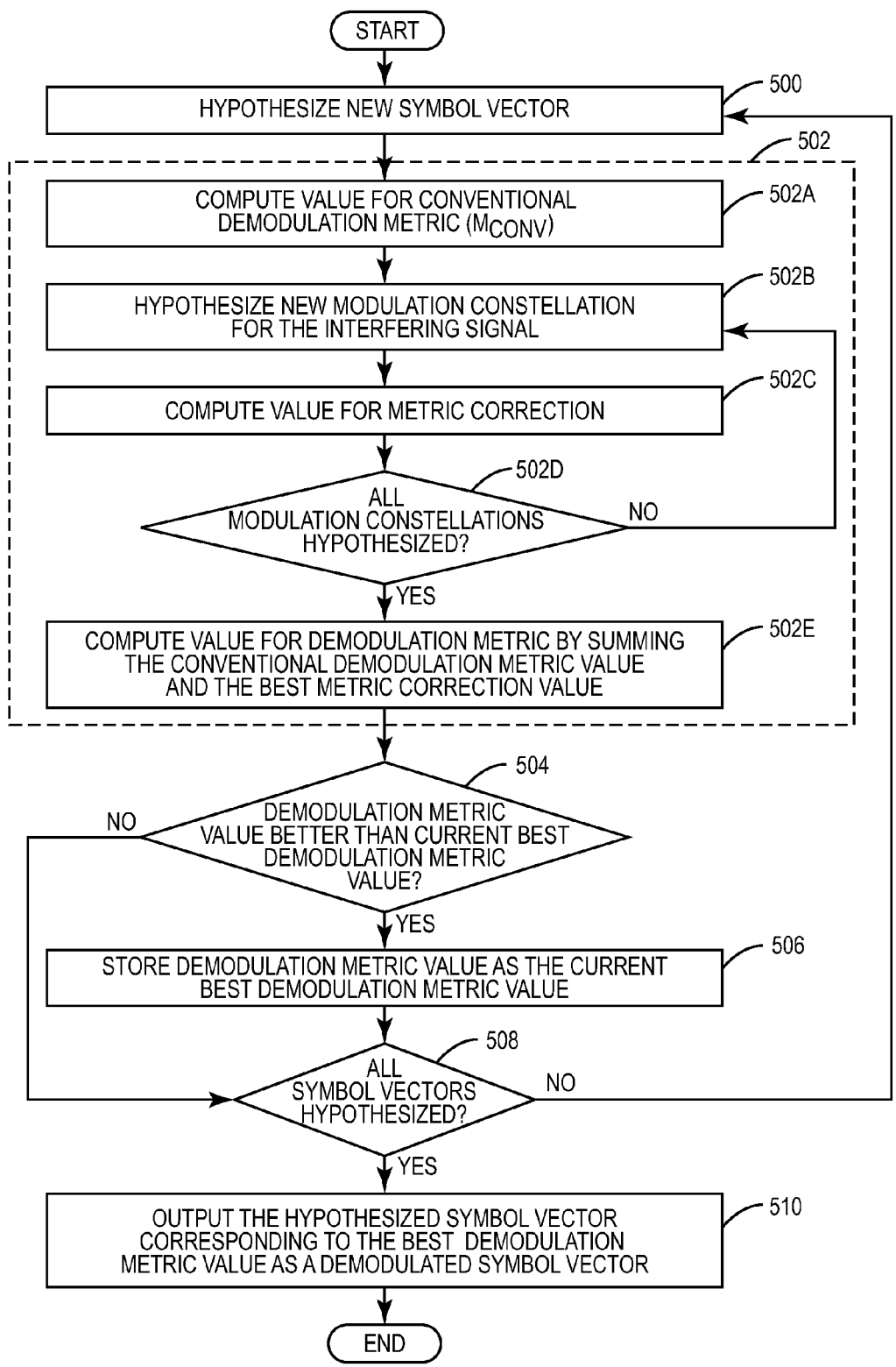
Figure 10:
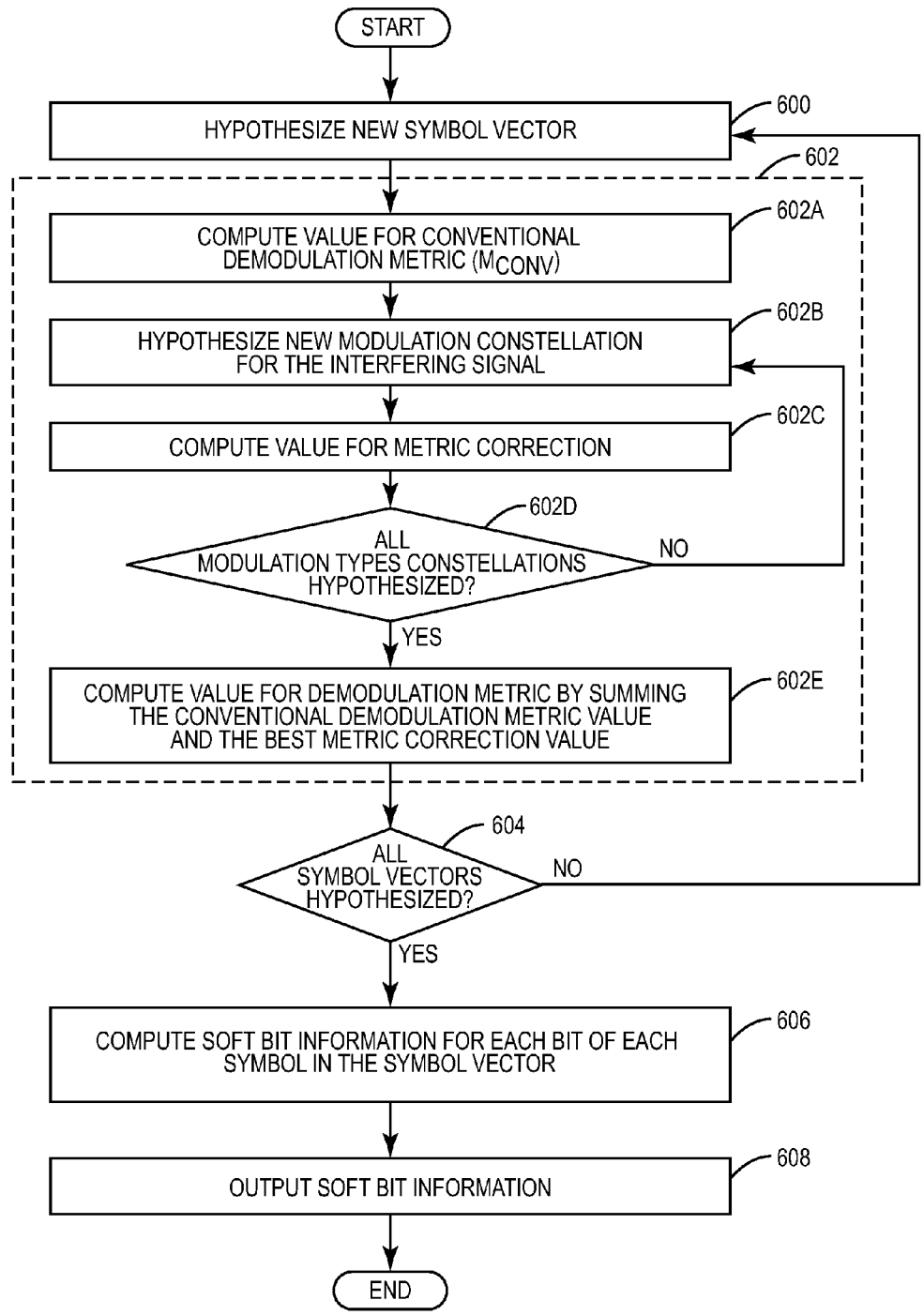
Figure 11:
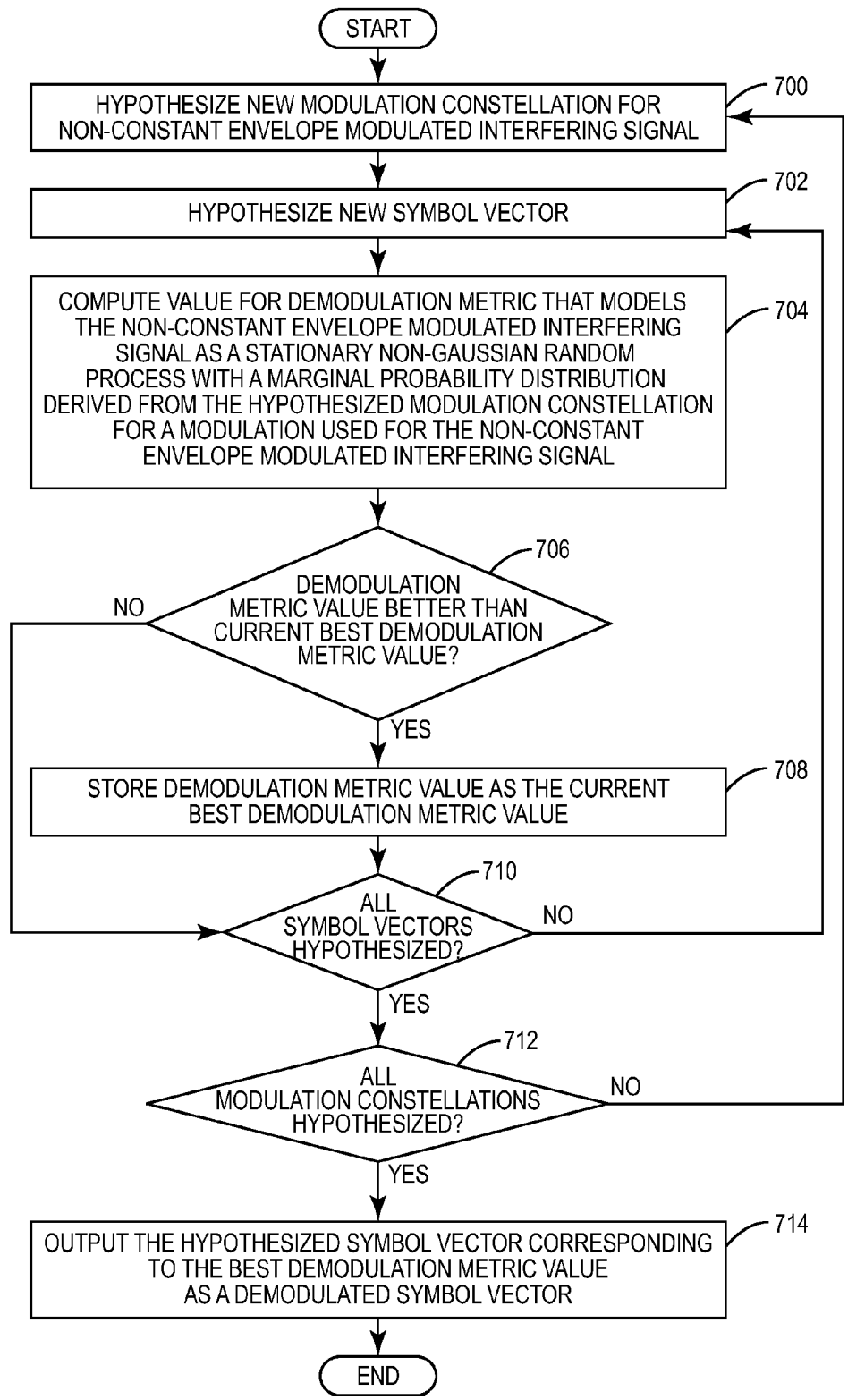
Figure 12:
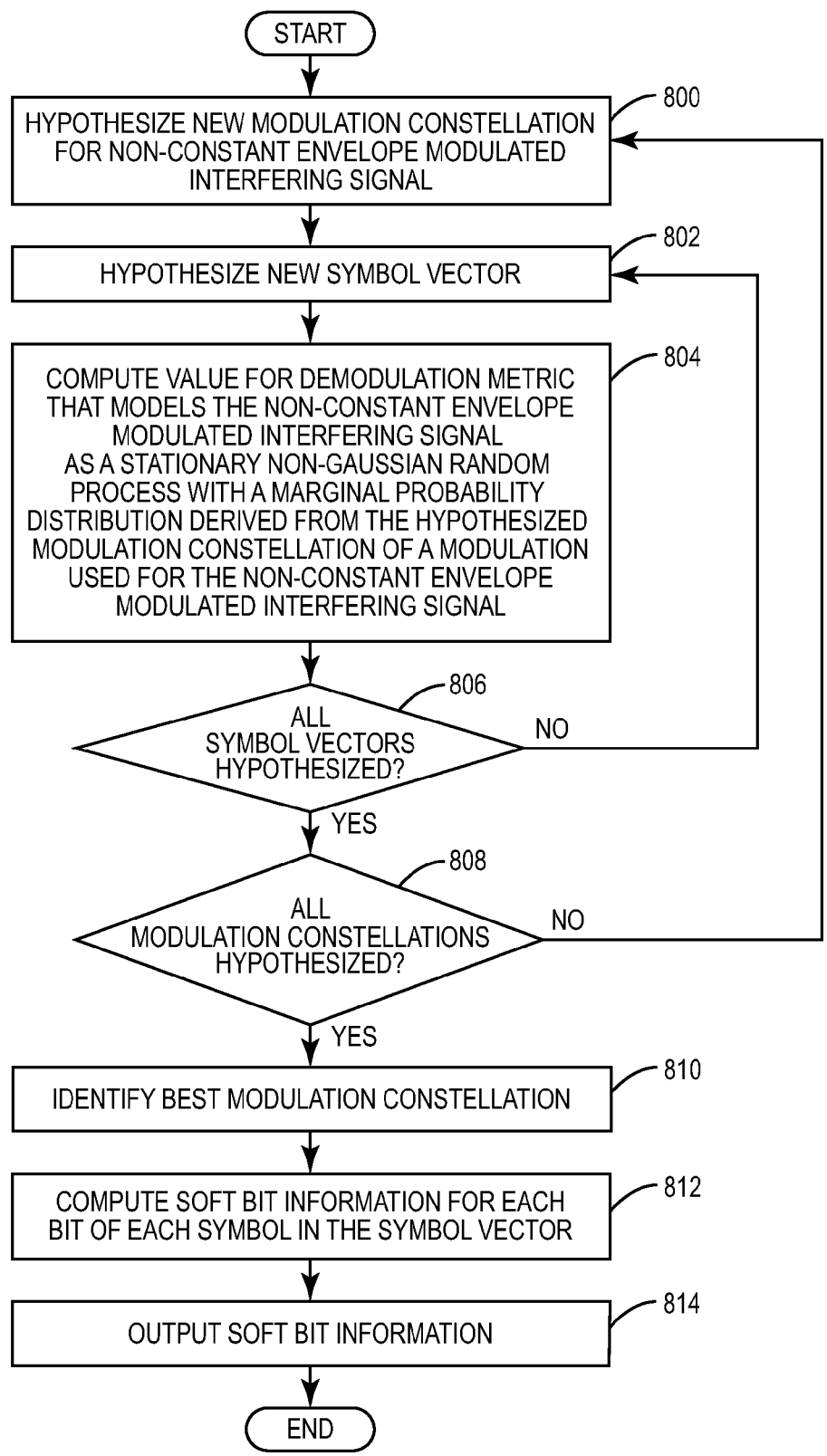

FIG. 5 is a flow chart illustrating a process for computing a value for a demodulation metric that models a non-constant envelope modulated interfering signal as a stationary non-Gaussian random process having a probability distribution derived based on a modulation constellation of a modulation used for the non-constant envelope modulated interfering signal according to one embodiment of the present disclosure;

FIG. 6 is a flow chart illustrating a process for computing a metric correction according to one embodiment of the present disclosure;

FIG. 7 graphically illustrates a concentric circle approximation of a demodulation metric according to one embodiment of the present disclosure;

FIG. 8 is a flow chart illustrating the operation of the demodulator of FIG. 1 to output soft bit information according to one embodiment of the present disclosure;

FIG. 9 is a flow chart illustrating the operation of the demodulator of FIG. 1 to output demodulated symbols where a modulation constellation of a modulation used for the non-constant envelope modulated interfering signal is unknown according to one embodiment of the present disclosure;

FIG. 10 is a flow chart illustrating the operation of the demodulator of FIG. 1 to output soft bit information where a modulation constellation of a modulation used for the non-constant envelope modulated interfering signal is unknown according to one embodiment of the present disclosure;

FIG. 11 is a flow chart illustrating the operation of the demodulator of FIG. 1 to output demodulated symbols where a modulation constellation of a modulation used for the non-constant envelope modulated interfering signal is unknown according to another embodiment of the present disclosure; and FIG. 12 is a flow chart illustrating the operation of the demodulator of FIG. 1 to output soft bit information where a modulation constellation of a modulation used for the non-constant envelope modulated interfering signal is unknown according to another embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a receiver 10 that utilizes enhanced metrics for demodulation and soft bit information generation in the presence of a non-constant envelope modulated interfering signal according to one embodiment of the present disclosure. Note that the receiver 10 of FIG. 1 is one non-limiting example of a receiver that may utilize the enhanced metrics disclosed herein. The receiver 10 may operate according to any suitable wireless communication standard such as, but not limited to, the Long Term Evolution (LTE), LTE-Advanced, WiFi, WiGig, or the like.

As illustrated, the receiver 10 includes a number of antennas 12-1 through 12-$n_R$, which are generally referred to herein collectively as antennas 12 or individually as antenna 12. The number ($n_R$) is generally an integer greater than or equal to 1. The receiver 10 also includes a downconverter 14, a demodulator 16, optionally a decoder 18, and a processing sub-system 20 arranged as shown. The downconverter 14 generally includes analog circuitry and, in some embodiments, digital circuitry that operates to downconvert a radio frequency signal received via the antenna(s) 12 to provide a downconverted signal. More generally, however, the downconverter 14 may represent, or be implemented using, any suitable combination of hardware and/or software. The downconverted signal is preferably a digital baseband signal. As discussed below, the digital baseband signal includes a desired signal, noise, and a non-constant envelope modulated interfering signal.

The demodulator 16 is preferably implemented in the digital domain using appropriate hardware such as, for example, one or more Digital Signal Processors (DSPs), one or more Application Specific Integrated Circuits (ASICs), or the like, or any combination thereof. More generally, however, the downconverter 14 may represent, or be implemented using, any suitable combination of hardware and/or software, including physical components common to the downconverter 14. The demodulator 16 demodulates the downconverted signal using a demodulation metric that models the non-constant envelope modulated interfering signal as a stationary non-Gaussian random process with a marginal probability distribution that is derived from a modulation constellation of a modulation used for the non-constant envelope modulated interfering signal. In one embodiment, the demodulator 16 outputs demodulated symbols to the processing sub-system 20. In another embodiment, the demodulator 16 outputs soft bit information for each bit of each symbol to the decoder 18 where the decoder 18 then decodes the soft bit information to output decoded symbols to the processing sub-system 20. The processing subsystem 20 may likewise represent, or be implemented using, any suitable combination of hardware and/or software, including physical components common to the downconverter 14 and/or the demodulator 16. For example, in particular embodiments, the downconverter 14, the demodulator 16, and the processing sub-system 20 may all represent or be implemented by a single processor (e.g., a general-purpose processor, DSP, or ASIC) or related group of processors common to all three elements.

Figure 2:
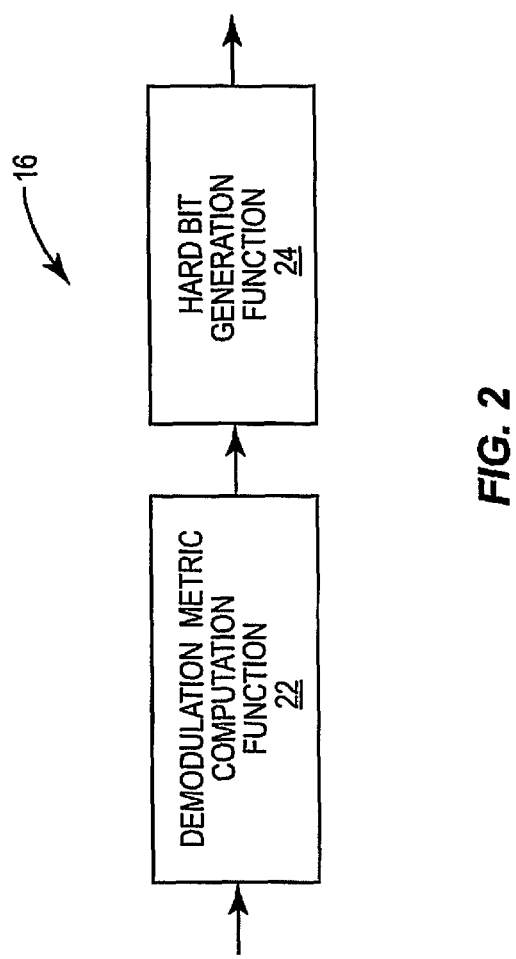
FIG. 2 is a more detailed block diagram of the demodulator of FIG. 1 wherein the demodulator outputs demodulated symbols according to one embodiment of the present disclosure.

FIG. 2 is a block diagram of the demodulator 16 of FIG. 1 according to one embodiment of the present disclosure. In this embodiment, the demodulator 16 outputs demodulated symbols. More specifically, as illustrated, the demodulator 16 includes a demodulation metric computation function 22 and a hard bit generation function 24 arranged as shown. As discussed below in detail, the demodulation metric computation function 22 generally operates to compute and output demodulation metric values for the downconverted signal. Each demodulation metric value is a statistical value that represents a probability, or likelihood, that a vector of symbols transmitted in a channel use of the desired signal is a particular hypothesized vector of symbols. Based on the demodulation metric values, the hard bit generation function 24 determines and outputs the demodulated symbols.

Figure 3:
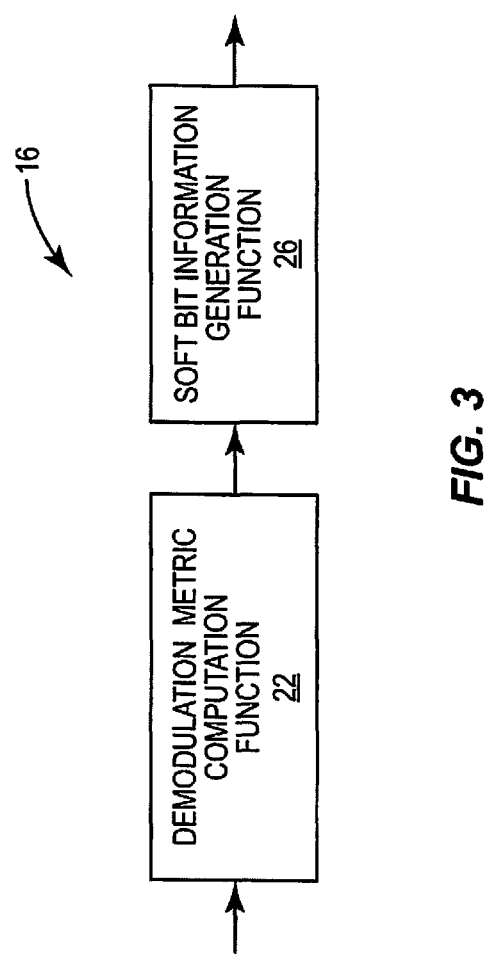
FIG. 3 is a more detailed block diagram of the demodulator of FIG. 1 wherein the demodulator outputs soft bit information according to one embodiment of the present disclosure.

FIG. 3 is a block diagram of the demodulator 16 of FIG. 1 according to another embodiment of the present disclosure. In this embodiment, the demodulator 16 outputs soft bit information. More specifically, as illustrated, the demodulator 16 includes the demodulation metric computation function 22 and a soft bit information generation function 26 arranged as shown. As discussed below in detail, the demodulation metric computation function 22 generally operates to compute and output demodulation metric values for the downconverted signal. Each demodulation metric value is a statistical value that represents a probability, or likelihood, that a vector of symbols transmitted in a channel use of the desired signal is a particular hypothesized vector of symbols. The soft bit information generation function 26 generates soft bit information based on the demodulation metric values from the demodulation metric computation function 22. The soft bit information generally includes statistical information for each bit of each received symbol that represents a relative probability, or more precisely, logarithm of ratio of likelihoods, that the bit takes either a first bit value (e.g., +1) or a second bit value (e.g., −1).

Before proceeding, a discussion of the demodulation metric utilized by the demodulator 16 is provided. In general, the demodulation metric models the non-constant envelope modulated interfering signal as a stationary non-Gaussian random process with a marginal probability distribution derived from a modulation constellation of a modulation used for the non-constant envelope modulated interfering signal. More specifically, in one embodiment, the downconverted signal output by the downconverter 14 is a digital baseband signal modeled as:

$$r = Hs + \underbrace{(h_I s_I + n)}_{v}, \qquad (3)$$

where $r=(r_1, r_2, \ldots, r_{n_R})$ denotes a signal vector for a particular channel use (e.g., for a particular subcarrier in a particular time slot in an Orthogonal Frequency Division Multiplexing (OFDM) transmission) of the signal received through $n_R$ receive antennas 12, H denotes an $n_R$-by-$n_S$ effective Multiple Input Multiple Output (MIMO) channel matrix for the desired signal, $s=[s_1, s_2, \ldots s_{n_S}]^T \in (\Lambda_D)^{n_S}$ denotes symbols in $n_S$ streams of desired information symbols of the desired signal for the channel use, $\Lambda_D$ denotes a set of constellation points in a modulation constellation of a modulation used for the desired information symbols of the desired signal, $s_I \in \Lambda_I$ denotes a symbol of the non-constant envelope modulated interfering signal normalized such that $E|s_I|^2=1$, $\Lambda_I$ denotes a set of constellation points in the modulation constellation of the modulation used for the non-constant envelope modulated interfering signal, $h_I$ denotes an $n_R$-by-1 Single Input Multiple Output (SIMO) channel vector for the non-constant envelope modulated interfering signal which in this embodiment is a single stream, n denotes an $n_R$-by-1 Gaussian noise vector with covariance matrix $R \equiv Enn^H$, and v is an impairment signal representing a sum of the non-constant envelope modulated interfering signal ($h_I s_I$) and the Gaussian noise (n). Notably, in one particular embodiment, the modulation used for the non-constant envelope modulated interfering signal is M-ary Quadrature Amplitude Modulation (QAM), where M is greater than or equal to 2.

Based on the model of the baseband signal defined in Equation (3), the demodulation metric utilized by the demodulator 16 can be defined as follows. Let $p_{s_I}(s) \equiv \text{Prob}(s_I=s)$ denote a probability mass function of the symbol $s_I$ of the non-constant envelope modulated interfering signal. Suppose H and $h_I$ are known, e.g. through joint or separate channel estimation over pilot signals. Then v can be modeled as a non-Gaussian noise vector with the probability density function given by:

$$p_{v[i]}(v) = \frac{1}{\pi^N \det(R)} \sum_{s \in \Lambda_I} p_{s_I}(s) \exp\{-(v - h_I s)^H R^{-1} (v - h_I s)\}. \qquad (4)$$

It follows that the Maximum-Likelihood (ML) metric (i.e., the demodulation metric $m_{new}$) for demodulating s is given by:

$$\begin{aligned} m_{new}(s \mid r, R, H, h_I) &\equiv -\ln p_v(r - Hs) \\ &= -\ln\left(\sum_{t \in \Lambda_I} p_{s_I}(t) \exp\{-(r - Hs - h_I s)^H R^{-1}(r^{[i-1]} - Hs - h_I t)\}\right) + \\ &\quad \ln(\pi^N \det(R)) \\ &= m_{conv}(s \mid r, R, H) + \Delta_{\Lambda_I}(s \mid r, R, H, h_I), \end{aligned} \qquad (5)$$

where:

$$m_{conv}(s \mid r, R, H) = (r - Hs)^H R^{-1}(r - Hs) + \ln(\pi^N \det(R)).$$

is the conventional Euclidean metric for colored Gaussian noise with covariance R with the last term being neglectable as it does not depend on s, and $$\Delta_{\Lambda_I}(s \mid r, R, H, h_I) \equiv \qquad (6)$$
$$-\ln\left(\sum_{t \in \Lambda_I} p_{s_I}(t)\exp\{2\text{Re}\{(r-Hs)^H R^{-1} h_I t\}\}\right) + h_I^H R^{-1} h_I$$

is a metric correction that depends on a non-Gaussian distribution of the interfering signal that is derived from the modulation constellation of the modulation used for the interfering signal. It is important to note that the metric correction depends only on a Whitened Residual-Interference Product (WRIP) given by:

$$(r-Hs)^H R^{-1} h_I = (r^H R^{-1} h_I) - s^H(H^H R^{-1} h_I) \qquad (7)$$

for a residual signal (r−Hs) and the interference channel $h_I$. Hence, to compute the metric correction, WRIP may first be computed for each hypothesized symbol vector s, as discussed below in detail. The demodulated symbols can then be computed by finding the best symbol vector s* that yields the smallest demodulation metric as:

$$s^* = \underset{s}{\text{argmin}}\{m_{conv}(s \mid r, R, H) + \Delta_{\Lambda_I}(s \mid r, R, H, h_I)\} \qquad (8)$$
$$= \underset{s}{\text{argmin}}\{(r-Hs)^H R^{-1}(r-Hs) + \Delta_{\Lambda_I}(s \mid r, R, H, h_I)\}.$$

For QAM, if it is assumed that the probability distribution of the symbol $s_I$ of the non-constant envelope modulated interfering signal is equally likely in $\Lambda_I$, i.e. $p_{s_I}(s) \equiv 1/|\Lambda_I|$, where |S| denotes the cardinality of the set S, the metric correction $\Delta_{\Lambda_I}$ can be expressed as:

$$\Delta_{\Lambda_I}(s \mid r, R, H, h_I) \equiv -\ln\left(\sum_{t \in \Lambda_I} \exp\{2\text{Re}\{(r-Hs)^H R^{-1} h_I t\}\}\right) + \qquad (9)$$
$$h_I^H R^{-1} h_I + \ln|\Lambda_I|$$
$$= -\ln\left(\sum_{t \in \Lambda_I \cap C^+} [\cosh\{2\text{Re}\{(r-Hs)^H R^{-1} h_I t\}\} + \right.$$
$$\cosh\{2\text{Im}\{(r-Hs)^H R^{-1} h_I t\}\}]) +$$
$$h_I^H R^{-1} h_I + \ln(2|\Lambda_I|),$$

where cos h( ) is the hyperbolic cosine function and $$C^+ = \{x \in : \text{Re}\{x\} > 0 \text{ and } \text{Im}\{x\} \geq 0\}$$

are the first quadrant of the complex plane excluding the imaginary axis. The last two terms in Equation (9) are constant and may be ignored. The second equality above follows from the property of a QAM constellation that $\Lambda_I = j\Lambda_I$, which in turn implies that $\Lambda = -\Lambda$. As an example, for Quadrature Phase Shift Keying (QPSK) modulation, the correction term reduces to:

$$\Delta_{\Lambda_I}(s \mid r, R, H, h_I) = -\ln(\cosh\{2\text{Re}\{(r-Hs)^H R^{-1} h_I e^{j\pi/4}\}\} + \qquad (10)$$
$$\cosh\{2\text{Im}\{(r-Hs)^H R^{-1} h_I e^{j\pi/4}\}\}) +$$
$$h_I^H R^{-1} h_I + \ln(2|\Lambda_I|)$$

-continued
$$= -\ln(\cosh\{\sqrt{2}\,(\text{Re}\{(r-Hs)^H R^{-1} h_I\} -$$
$$\text{Im}\{(r-Hs)^H R^{-1} h_I\})\} +$$
$$\cosh\{\sqrt{2}\,(\text{Re}\{(r-Hs)^H R^{-1} h_I\} +$$
$$\text{Im}\{(r-Hs)^H R^{-1} h_I\})\}) +$$
$$h_I^H R^{-1} h_I + \ln(2|\Lambda_I|)..$$

Figure 4:
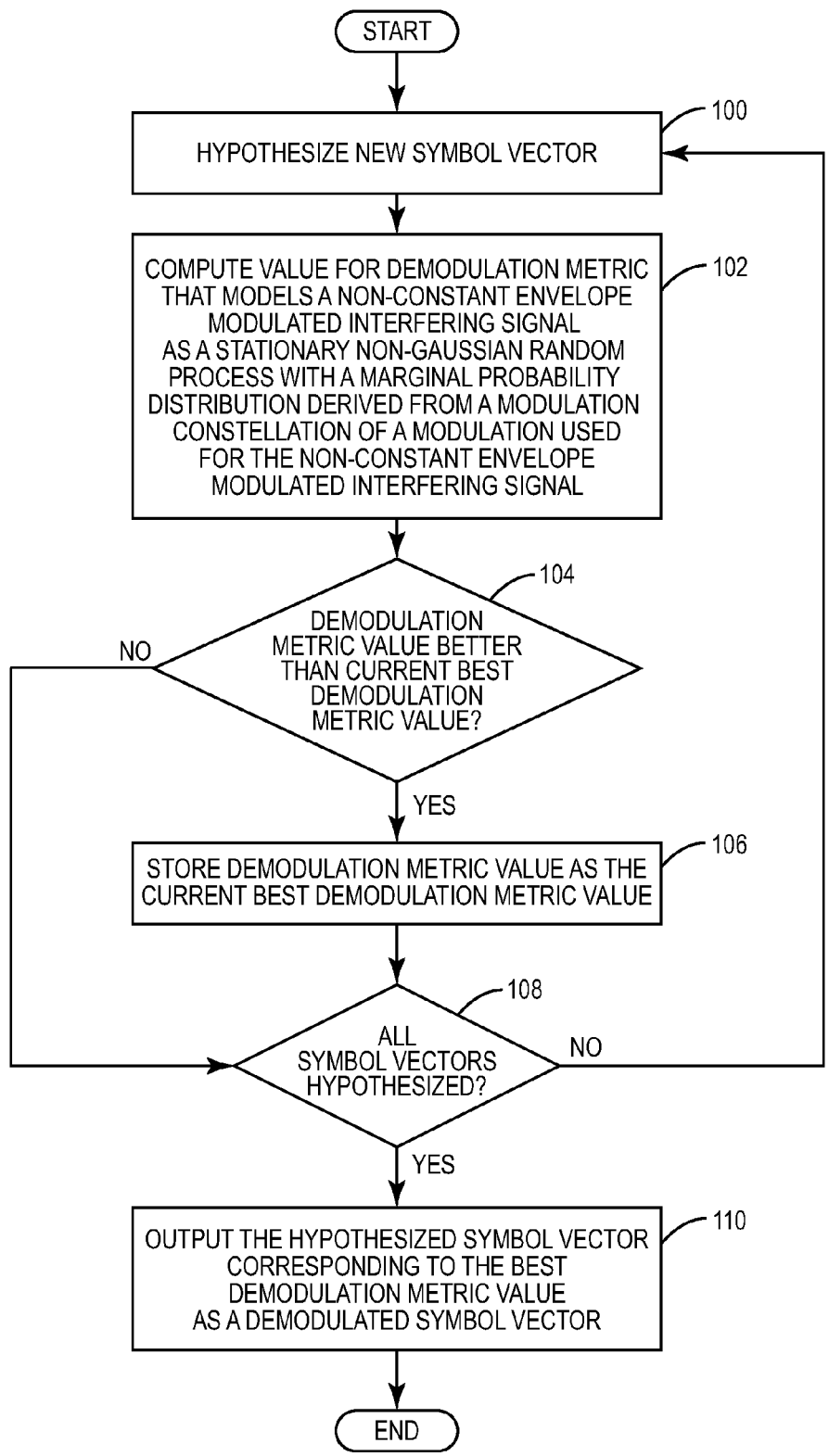
FIG. 4 is a flow chart illustrating the operation of the demodulator of FIG. 1 to output demodulated symbols or corresponding bits according to one embodiment of the present disclosure.

FIG. 4 is a flow chart that illustrates the operation of the demodulator 16 of FIG. 1 according to one embodiment of the present disclosure. This process describes the demodulation of the desired signal for a particular channel use (e.g., a particular subcarrier frequency and time slot where the desired signal is an OFDM signal) to output a number of demodulated symbols transmitted in the channel use. First, the demodulator 16 hypothesizes a new vector of transmitted symbols, referred to as symbol vector s (step 100). Next, using the hypothesized symbol vector, the demodulator 16 computes a value (i.e., a demodulation metric value) for the demodulation metric ($m_{new}$) that models the non-constant envelope modulated interfering signal as a stationary non-Gaussian random process with a marginal probability distribution for a modulation constellation of a modulation used for the non-constant envelope modulated interfering signal (step 102). In one embodiment, the demodulation metric value is computed based on Equation (5) above. However, as discussed below, the present disclosure is not limited thereto. Before proceeding, it should be noted that the various computations discussed herein may be performed using look-up tables, by actually performing the computations based on the corresponding equations or approximations thereof, or the like.

In this embodiment, the demodulator 16 then determines whether the demodulation metric value computed in step 102 for the hypothesized symbol vector is better than a current best demodulation metric value (step 104). Initially, the current best demodulation metric value is some initial, or default value, such as, for example, a maximum possible value for the demodulation metric. In one embodiment, the demodulation metric is the demodulation metric ($m_{new}$) defined above in Equation (5), and the demodulation metric value computed in step 102 is better than the current best demodulation metric value if the demodulation metric value is less than the current best demodulation metric value. If the demodulation metric value computed in step 102 is not better than the current best demodulation metric value, the process proceeds to step 108. However, if the demodulation metric value is better than the current best demodulation metric value, then the demodulator 16 stores the demodulation metric value as the current best demodulation metric value (step 106).

Next, whether proceeding from step 104 or 106, the demodulator 16 determines whether all possible symbol vectors (i.e., all symbol vectors s=$[s_1, s_2, \ldots s_{n_S}]^T \in (\Lambda_D)^{n_S}$) have been hypothesized (step 108). If not, the process returns to step 100 and is repeated until all symbol vectors have been hypothesized. Once all symbol vectors have been hypothesized and corresponding demodulation metric values have been computed, the demodulator 16 outputs the hypothesized symbol vector corresponding to the best demodulation metric value as a demodulated symbol vector (step 110). The demodulated symbol vector includes the number $n_S$ symbols transmitted in the desired signal at this particular channel use.

FIG. 5 illustrates step 102 of FIG. 4 in more detail according to one particular embodiment of the present disclosure. As illustrated, in order to compute the demodulation metric value for a particular hypothesized symbol vector, the demodulator 16 computes a value for the conventional demodulation metric ($m_{conv}$) that models the noise (n) of the non-constant envelope modulated interfering signal as a stationary Gaussian random process with a Gaussian marginal probability distribution (step 200). As discussed above, the conventional demodulation metric ($m_{conv}$) is defined as:

$$m_{conv}(s|r,R,H)=(r-Hs)^H R^{-1}(r-Hs)+\ln(\pi^N det(R)).$$

Again, note that the last term (i.e., $\ln(\pi^N \det(R))$) may be ignored since it does not depend on s. In addition, the demodulator 16 computes a value for the metric correction ($\Delta_{\Lambda_I}$) (step 202). As discussed above, in one embodiment, the metric correction ($\Delta_{\Lambda_I}$) is defined as:

$$\Delta_{\Lambda_I}(s|r,R,H,h_I) \equiv$$
$$-\ln\left(\sum_{t \in \Lambda_I} p_{s_I}(t)\exp\{2\text{Re}\{(r-Hs)^H R^{-1} h_I t\}\}\right) + h_I^H R^{-1} h_I.$$

Lastly, the demodulator 16 computes the demodulation metric value by summing the conventional demodulation metric value and the metric correction value (step 204).

FIG. 6 illustrates step 202 of FIG. 5 in more detail according to one embodiment of the present disclosure. In order to compute the metric correction value, the demodulator 16 computes an overwhitened interfering channel value (step 300). Specifically, the overwhitened interfering channel value is computed as $R^{-1}h_I$. The demodulator 16 also computes a residual signal value (step 302). The residual signal value is computed as ($r-Hs$). The demodulator 16 then computes a WRIP value based on the overwhitened interfering channel value and the residual signal value (step 304). Specifically, the WRIP value is defined by the equation $(r-Hs)^H R^{-1} h_I$. Lastly, the demodulator 16 computes the metric correction value as a non-linear function of the WRIP value (step 306). In one particular embodiment, the metric correction value is computed based on the equation:

$$\Delta_{\Lambda_I}(s|r,R,H,h_I) \equiv -\ln\left(\sum_{t \in \Lambda_I} p_{s_I}(t)\exp\{2\text{Re}(WRIP \cdot t)\}\right) + h_I^H R^{-1} h_I.$$

It should be noted that the overwhitened interfering channel value is not limited to use in the computation of the metric correction value. In fact, the overwhitened interfering channel value may be used to perform other suitable functions in the receiver 10 such as, for example, the computation of interference-to-noise (I/N) ratio which can be used for the detection of a dominant interferer.

In some implementations, it may be desired to reduce the computational complexity of the demodulator 16. In one embodiment, computational complexity is reduced by approximating the modulation constellation of the modulation used for the non-constant envelope modulated interfering signal. More specifically, the modulation constellation may be approximated as a combination of multiple circular modulation constellations. In one particular embodiment, the modulation used for the non-constant envelope modulated interfering signal is a M-ary QAM with M=$2^B$ where B is an integer greater than or equal to 2. The M-ary QAM constellation is approximated by decomposing the M-ary QAM constellation into a number of QPSK constellations and a number of rotated and possibly non-uniform 8-Phase Shift Keying (8PSK) constellations. A magnitude of each of the 8PSK constellations is equal to the square root of a sum of two different integers, while a magnitude of each of the QPSK constellations is equal to the square root of two times the square of an integer. When M is large, two of the 8PSK constellations may have the same magnitude, in which case they are still treated as the separate 8PSK modulations superimposed on each other. Each of the 8PSK constellations may be approximated by a constant envelope distribution. For example, 16-QAM can be approximated by one rotated 8PSK constellation and two QPSK constellations with different amplitudes, as shown in FIG. 7. Specifically, FIG. 7 illustrates a 16-QAM constellation approximated as a superposition of a rotated 8PSK constellation and two QPSK constellations.

More generally, when the number of bits B is even, the M-ary QAM (M=$2^B$) can be decomposed into $N_{8PSK}(\Lambda_I)$=($\sqrt{M}/4)(\sqrt{M}/2-1)$ 8PSK component constellations and $N_{QPSK}(\Lambda_I)$=$\sqrt{M}/2$ QPSK component constellations of different amplitudes. By approximating each 8PSK component constellation by a complex-valued random variable with constant magnitude, the correction metric ($\Delta_{\Lambda_I}$) in Equation (6) can be approximated as:

$$\Delta_{\Lambda_I}(s|r,R,H,h_I) \approx \tag{11}$$
$$-\ln\left(\sum_{i=1}^{N_{QPSK}(\Lambda_I)} \left(\cosh\{\sqrt{2}\, q_i(\text{Re}\{(r-Hs)^H R^{-1} h_I\} - \text{Im}\{(r-Hs)^H R^{-1} h_I\})\} + \cosh\{\sqrt{2}\, q_i(\text{Re}\{(r-Hs)^H R^{-1} h_I\} + \text{Im}\{(r-Hs)^H R^{-1} h_I\})\}\right) + \frac{2}{\pi}\sum_{j=1}^{N_{8PSK}(\Lambda_I)} I_0(2e_j|(r-Hs)^H R^{-1} h_I|)\right) +$$
$$h_I^H R^{-1} h_I + \ln(2|\Lambda_I|),$$

where $I_0(x) \equiv (2\pi)^{-1}\int_0^{2\pi} e^{x\,\cos\,\theta}d\theta$ is a zero-th order modified Bessel function of the first kind which stems from the circularly symmetric property of the approximating distribution, $q_i=(2i-1)a_M/(\sqrt{M}-1)$ is the amplitude of the i-th QPSK component constellation, $a_M=\sqrt{(3/2)(\sqrt{M}-1)/(\sqrt{M}+1)}$ is the maximum magnitude of the M-ary QAM, $e_j=\sqrt{l_j^2+m_j^2}\,a_M/(\sqrt{M}-1)$ denotes the amplitude of the j-th 8PSK component constellation, $l_j$ and $m_j$ denote two distinct integers from the set of odd integers $\{1, 3, 5, \ldots, \sqrt{M}-1\}$ with each combination corresponding to each j. The last two terms may again be ignored. A similar set of constants $\{q_i\}$, $\{e_j\}$, $N_{QPSK}(\Lambda_I)$, and $N_{8PSK}(\Lambda_I)$ can be derived for the case when B is odd.

One may also approximate each QPSK component constellation by a complex-valued random variable with constant magnitude, in which case the correction metric ($\Delta_{\Lambda_I}$) in Equation (6) can be approximated as:

$$\Delta_{\Lambda_I}(s|r,R,H,h_I) \approx -\ln\left(\sum_{i=1}^{N_{QPSK}(\Lambda_I)} I_0(2q_i|(r-Hs)^H R^{-1} h_I|) + 2\sum_{j=1}^{N_{8PSK}(\Lambda_I)} I_0(2e_j|(r-Hs)^H R^{-1} h_I|)\right). \tag{12}$$

The same formula applies to the case when B is odd with a different set of modulation-specific constants: $\{q_i\}$, $\{e_j\}$, $N_{QPSK}(\Lambda_I)$, and $N_{8PSK}(\Lambda_I)$. In fact, this general technique of approximating a group of discrete constellation points as generally circular component constellations can be applied to other modulation types and is not limited to QAM.

Alternatively, for a large QAM constellation, e.g. 256-QAM used in the latest versions of WiFi, the correction metric ($\Delta_{\Lambda_I}$) in Equation (6) can be approximated using an integral as:

$$\Delta_{\Lambda_I}(s \mid r, R, H, h_I) \approx -\ln\left(\int_{-a}^{a}\int_{-a}^{a} \exp\{2\text{Re}\{(r - Hs)^H R^{-1} h_I(x + jy)\}\} dx\, dy\right) + h_I^H R^{-1} h_I + \ln|\Lambda_I| \quad (13)$$

$$= -\ln\left(\begin{bmatrix}\int_{-1}^{1} a^2 \exp\{2a\text{Re}\{(r - Hs)^H R^{-1} h_I)\}x\} dx\end{bmatrix} \cdot \begin{bmatrix}\int_{-1}^{1} a^2 \exp\{-2a\text{Im}\{(r - Hs)^H R^{-1} h_I)\}y\} dy\end{bmatrix}\right) + h_I^H R^{-1} h_I + \ln|\Lambda_I|$$

$$= -\ln\left(\frac{\sinh(2a\text{Re}\{(r - Hs)^H R^{-1} h_I)\})\sinh(2a\text{Im}\{(r - Hs)^H R^{-1} h_I)\})}{\text{Re}\{(r - Hs)^H R^{-1} h_I)\}\text{Im}\{(r - Hs)^H R^{-1} h_I)\}}\right) +$$

$$h_I^H R^{-1} h_I + \ln(|\Lambda_I|/a^2)$$

$$= -\ln(\text{sinch}(2a\text{Re}\{(r - Hs)^H R^{-1} h_I)\})) - \ln(\text{sinch}(2a\text{Im}\{(r - Hs)^H R^{-1} h_I)\})) +$$

$$h_I^H R^{-1} h_I + \ln(|\Lambda_I|/a^2),$$

where $a \times \sqrt{3/2}$ is a normalization constant that ensures $E|s_I|^2=1$ sin h( ) is the hyperbolic sine function, and sin ch(x)=sin h(x)/x, which is referred to as a hyperbolic sin c function. The last two terms are independent of s and can be ignored. Note that the same approach of approximating a group of densely populated discrete constellation points by a continuous region can be applied to other modulations besides QAM.

FIG. 8 is a flow chart that illustrates the operation of the demodulator 16 of FIG. 1 according to another embodiment of the present disclosure. This process describes the demodulation of the desired signal for a particular channel use (e.g., a particular subcarrier frequency and time slot where the desired signal is an OFDM signal) to output corresponding soft bit information for each bit of each symbol transmitted during the channel use. First, the demodulator 16 hypothesizes a new vector of transmitted symbols, referred to as symbol vector s (step 400). Next, using the hypothesized symbol vector, the demodulator 16 computes a value (i.e., a demodulation metric value) for the demodulation metric ($m_{new}$) that models the non-constant envelope modulated interfering signal as a stationary non-Gaussian random process with a marginal probability distribution for a modulation constellation of a modulation used for the non-constant envelope modulated interfering signal (step 402). As described above, in one embodiment, the demodulation metric value is computed based on Equation (5). However, as discussed below, the present disclosure is not limited thereto.

In this embodiment, the demodulator 16 then determines whether all possible symbol vectors (i.e., all symbol vectors $s=[s_1, s_2, \ldots s_{n_S}] \in (\Lambda_D)^{n_S}$) have been hypothesized (step 404). If not, the process returns to step 400 and is repeated until all symbol vectors have been hypothesized. Once all symbol vectors have been hypothesized and corresponding demodulation metric values have been computed, the demodulator 16 computes soft bit information for each bit of each symbol transmitted in symbol vector s (step 406). More specifically, using the demodulation metric defined in Equation (5), the soft bit information for bit $b_{i,k}$, an i-th bit of a k-th symbol $s_k$, can be computed as:

$$\beta_{k,i}^{new} \equiv \ln\frac{p(b_{k,i} = 1 \mid r)}{p(b_{k,i} = -1 \mid r)} \quad (14)$$

$$= \ln\sum_{s \in \Lambda_D: b_{k,i}=1} \exp\{-m_{new}(s \mid r, R, H, h_I)\} -$$

-continued $$\ln\sum_{s \in \Lambda_D: b_{k,i}=-1} \exp\{-m_{new}(s \mid r, R, H, h_I)\} + \alpha_{k,i}$$

$$\approx \min_{s \in \Lambda_D: b_{k,i}=-1} [m_{conv}(s \mid r, R, H) + \Delta_{\Lambda_I}(s \mid r, R, H, h_I)] -$$

$$\min_{s \in \Lambda_D: b_{k,i}=1} [m_{conv}(s \mid r, R, H) + \Delta_{\Lambda_I}(s \mid r, R, H, h_I)] +$$

$$\alpha_{k,i}$$

$$= \min_{s \in \Lambda_D: b_{k,i}=-1} \left\{ \begin{array}{c} (r - Hs)^H R^{-1}(r - Hs) + \\ \Delta_{\Lambda_I}(s \mid r, R, H, h_I) \end{array} \right\} -$$

$$\min_{s \in \Lambda_D: b_{k,i}=1} \left\{ \begin{array}{c} (r - Hs)^H R^{-1}(r - Hs) + \\ \Delta_{\Lambda_I}(s \mid r, R, H, h_I) \end{array} \right\} + \alpha_{k,i},$$

where $\alpha_{k,i} \equiv \ln[p(b_{k,i}=1)/p(b_{k,i}=-1)]$ denotes a priori information about the bit $b_{k,i}$, if available. The demodulator 16 then outputs the soft bit information (step 408). To reduce computational complexity, the demodulator 16 may choose to hypothesize only a subset of all the possible symbol vectors, such as those that are close to the demodulated symbol vector generated through hard decision (e.g., step 110 in FIG. 4), when computing each soft bit, as it is often done in practical implementations.

In the embodiments described above, it is assumed that the modulation, or more specifically the modulation constellation, used for the non-constant envelope modulated interfering signal is known. For example, in some wireless networks a particular QAM constellation (e.g., QPSK or 16-QAM) used by the interfering signal may be specified by a modulation-coding-scheme (MCS) index, which may be overheard by the receiver 10 over a control channel of the interfering signal. However, in some implementations, the modulation constellation of the interfering signal may not be able to be determined.

More precisely, let $\Gamma \equiv \{\Lambda_{I,1}, \Lambda_{I,2}, \ldots, \Lambda_{I,n_C}\}$ be the set of all possible modulation constellations of the modulation of the interfering signal, where $n_C$ denotes the number of modulation constellations. In one preferred embodiment, the modulation constellations are QAM constellations of different sizes (e.g., QPSK, 16-QAM, 64-QAM, etc). In one embodiment, the maximum-likelihood demodulation metric can be defined by replacing the metric correction term with the minimum of metric correction terms corresponding to the possible modulation constellations; that is, $$\Delta^\Gamma(s \mid r, R, H, h_I) = \min_{\Lambda_I \in \Gamma} \{\Delta_{\Lambda_I}(s \mid r, R, H, h_I)\}, \quad (15)$$

where $\Delta_{\Lambda_I}(s|r,R,H,h_I)$ is defined above. Note that for this constellation-matched metric correction, the term $\ln|\Lambda_I|$ appearing in some of the equations above for $\Delta_{\Lambda_I}(s|r,R,H,h_I)$ should not be ignored as it provides the proper penalty in the maximum-likelihood sense for choosing a larger constellation. For this case, the resulting demodulation metric is given by:

$$m_{new}(s|r,R,H) = m_{conv}(s|r,R,H) + \Delta^\Gamma(s|r,R,H,h_I) \quad (16)$$

so that the demodulated symbol vector is given by:

$$s^* = \operatorname*{argmin}_s \{m_{conv}(s \mid r, R, H) + \Delta^\Gamma(s \mid r, R, H, h_I)\}. \quad (17)$$

Equivalently, one can first demodulate the symbol for each hypothesized modulation constellation and then find the best modulation constellation that yields the smallest demodulation metric. That is, compute:

$$\Lambda_I^* = \operatorname*{argmin}_{\Lambda_I \in \Gamma}\left[\min_{s \in \Lambda_D} \{m_{conv}(s \mid r, R, H) + \Delta_{\Lambda_I}(s \mid r, R, H, h_I)\}\right], \quad (18)$$

and the demodulated symbol vector s* is given by the one that corresponds to the best modulated constellation $\Lambda_I^*$; that is:

$$s^* = \operatorname*{argmin}_s \{m_{conv}(s \mid r, R, H) + \Delta_{\Lambda_I^*}(s \mid r, R, H, h_I)\}. \quad (19)$$

Assuming that each constellation in $\Gamma$ is equally likely, soft bit information can be computed in a similar manner as:

$$\beta_{k,i}^{new} = \ln \sum_{s \in \Lambda_D : b_{k,i}=1} \left\{\exp\{-m_{conv}(s \mid r, R, H)\} \sum_{\Lambda_I \in \Gamma} e^{-\Delta_{\Lambda_I}(s|r,R,H,h_I)}\right\} - \ln \sum_{s \in \Lambda_D : b_{k,i}=-1} \left\{\exp\{-m_{conv}(s \mid r, R, H)\} \sum_{\Lambda_I \in \Gamma} e^{-\Delta_{\Lambda_I}(s|r,R,H,h_I)}\right\} + \alpha_{k,i}$$

$$\approx \min_{s \in \Lambda_D : b_{k,i}=-1} [m_{conv}(s \mid r, R, H) + \Delta^\Gamma(s \mid r, R, H, h_I)] - \min_{s \in \Lambda_D : b_{k,i}=1} [m_{conv}(s \mid r, R, H) + \Delta^\Gamma(s \mid r, R, H, h_I)] + \alpha_{k,i}$$

$$\approx \min_{s \in \Lambda_D : b_{k,i}=-1} [m_{conv}(s \mid r, R, H) + \Delta_{\Lambda_I^*}(s \mid r, R, H, h_I)] - \quad (20)$$

$$\min_{s \in \Lambda_D : b_{k,i}=1} [m_{conv}(s \mid r, R, H) + \Delta_{\Lambda_I^*}(s \mid r, R, H, h_I)] + \alpha_{k,i}.$$

Based on Equations (15) through (20), FIGS. 9 through 12 illustrate the operation of the demodulator 16 to demodulate the desired signal for a particular channel use when the modulation of the non-constant envelope modulated interfering signal is not known according to a number of embodiments of the present disclosure. FIG. 9 is a flow chart that illustrates the operation of the demodulator 16 of FIG. 1 to output a number of demodulated symbols transmitted in a particular channel use when the modulation of the non-constant envelope modulated interfering signal is unknown. In general, the process of FIG. 9 implements Equations (15) through (17) above.

First, the demodulator 16 hypothesizes a new vector of transmitted symbols, referred to as symbol vector s (step 500). Next, using the hypothesized symbol vector, the demodulator 16 computes a value (i.e., a demodulation metric value) for the demodulation metric ($m_{new}$) that models the non-constant envelope modulated interfering signal as a stationary non-Gaussian random process with a marginal probability distribution for a modulation constellation of a modulation used for the non-constant envelope modulated interfering signal (step 502). In one embodiment, the demodulation metric value is computed based on Equations (15) and (16) above. However, as discussed below, the present disclosure is not limited thereto.

More specifically, in order to compute the demodulation metric value for the hypothesized symbol vector, the demodulator 16 computes a value for the conventional demodulation metric ($m_{conv}$) (step 502A). As discussed above, the conventional demodulation metric ($m_{conv}$) is defined as:

$$m_{conv}(s|r,R,H) = (r-Hs)^H R^{-1}(r-Hs) + \ln(\pi^N \det(R)).$$

Again, note that the last term (i.e., $\ln(\pi^N \det(R))$) may be ignored since it does not depend on s. The demodulator 16 then hypothesizes a new modulation constellation for the interfering signal from the set of all possible modulation constellations $\Gamma \equiv \{\Lambda_{I,1}, \Lambda_{I,2}, \ldots, \Lambda_{I,n_C}\}$ (step 502B) and computes a metric correction value for the hypothesized modulation constellation (step 502C). More specifically, the metric correction value is computed based on Equation (6), which is:

$$\Delta_{\Lambda_I}(s \mid r, R, H, h_I) \equiv$$
$$-\ln\left(\sum_{t \in \Lambda_I} p_{s_I}(t)\exp\{2\operatorname{Re}\{(r-Hs)^H R^{-1} h_I t\}\}\right) + h_I^H R^{-1} h_I.$$

The demodulator 16 then determines whether all possible modulation constellations have been hypothesized (step 502D). If not, the process returns to step 502B and is repeated until all possible modulation constellations have been hypothesized. At that point, the demodulator 16 computes the demodulation metric value for the hypothesized symbol vector by summing the conventional demodulation metric value and the best metric correction value among the metric correction values computed for the possible modulation constellations (step 502E). More specifically, the demodulator 16 may first determine the best metric correction term $\Delta^\Gamma$ based on Equation (15), and then compute the demodulation metric value based on Equation (16).

In this embodiment, the demodulator 16 then determines whether the demodulation metric value for the hypothesized symbol vector computed in step 502 is better than a current best demodulation metric value (step 504). Initially, the current best demodulation metric value is some initial, or default, value such as, for example, a maximum possible value for the demodulation metric. In one embodiment, the demodulation metric is the demodulation metric ($m_{new}$) defined above in Equation (16), and the demodulation metric value computed in step 502 is better than the current best demodulation metric value if the demodulation metric value is less than the current best demodulation metric value. If the demodulation metric value computed in step 502 is not better than the current best demodulation metric value, the process proceeds to step 508. However, if the demodulation metric value is better than the current best demodulation metric value, then the demodulator 16 stores the demodulation metric value as the current best demodulation metric value (step 506).

Next, whether proceeding from step 504 or 506, the demodulator 16 determines whether all possible symbol vectors (i.e., all symbol vectors $s=[s_1, s_2, \ldots s_{n_s}]^T \epsilon (\Lambda_D)^{n_s}$) have been hypothesized (step 508). If not, the process returns to step 500 and is repeated until all symbol vectors have been hypothesized. Once all symbol vectors have been hypothesized and corresponding demodulation metric values have been computed, the demodulator 16 outputs the hypothesized symbol vector corresponding to the best demodulation metric value as a demodulated symbol vector (step 510). The demodulated symbol vector includes the number $n_S$ symbols transmitted in the desired signal at this particular channel use.

FIG. 10 is a flow chart that illustrates the operation of the demodulator 16 of FIG. 1 to output soft bit information for each bit of each symbol transmitted in a particular channel use when the modulation of the non-constant envelope modulated interfering signal is unknown. In general, the process of FIG. 10 implements Equation (20) above.

First, the demodulator 16 hypothesizes a new vector of transmitted symbols, referred to as symbol vector s (step 600). Next, using the hypothesized symbol vector, the demodulator 16 computes a value (i.e., a demodulation metric value) for the demodulation metric ($m_{new}$) that models the non-constant envelope modulated interfering signal as a stationary non-Gaussian random process with a marginal probability distribution for a modulation constellation of a modulation used for the non-constant envelope modulated interfering signal (step 602). In one embodiment, the demodulation metric value is computed based on Equations (15) and (16) above. However, the present disclosure is not limited thereto.

More specifically, in order to compute the demodulation metric value for the hypothesized symbol vector, the demodulator 16 computes a value for the conventional demodulation metric ($m_{conv}$) (step 602A). As discussed above, the conventional demodulation metric ($m_{conv}$) is defined as:

$$m_{conv}(s|r,R,H) = (r-Hs)^H R^{-1}(r-Hs) + \ln(\pi^N \det(R)).$$

Again, note that the last term (i.e., $\ln(\pi^N \det(R))$) may be ignored since it does not depend on s. The demodulator 16 then hypothesizes a new modulation constellation for the interfering signal from the set of all possible modulation constellations $\Gamma\{\Lambda_{I,1}, \Lambda_{I,2}, \ldots, \Lambda_{I,n_C}\}$ (step 602B) and computes a metric correction value for the hypothesized modulation constellation (step 602C). More specifically, the metric correction value is computed based on Equation (6), which is:

$$\Delta_{\Lambda_I}(s|r,R,H,h_I) \equiv$$
$$-\ln\left(\sum_{t \in \Lambda_I} p_{s_I}(t)\exp\{2\mathrm{Re}\{(r-Hs)^H R^{-1} h_I t\}\}\right) + h_I^H R^{-1} h_I.$$

The demodulator 16 then determines whether all possible modulation constellations have been hypothesized (step 602D). If not, the process returns to step 602B and is repeated until all possible modulation constellations have been hypothesized. At that point, the demodulator 16 computes the demodulation metric value for the hypothesized symbol vector by summing the conventional demodulation metric value and the best metric correction value among the metric correction values computed for the possible modulation constellations (step 602E). More specifically, the demodulator 16 may first determine the best demodulation metric $\Delta^\Gamma$ based on Equation (15), and then compute the demodulation metric value based on Equation (16).

In this embodiment, the demodulator 16 then determines whether all possible symbol vectors (i.e., all symbol vectors $s=[s_1, s_2, \ldots s_{n_s}]^T \epsilon (\Lambda_D)^{n_s}$) have been hypothesized (step 604). If not, the process returns to step 600 and is repeated until all symbol vectors have been hypothesized. Once all symbol vectors have been hypothesized and corresponding demodulation metric values have been computed, the demodulator 16 computes soft bit information for each bit of each symbol transmitted (step 606). More specifically, the soft bit information is preferably computed based on Equation (20). The demodulator 16 then outputs the soft bit information (step 608). To reduce computational complexity, the demodulator 16 may choose to hypothesize only a subset of all the possible symbol vectors, such as those that are close to the demodulated symbol vector generated through hard decision, when computing each soft bit, as it is often done in practical implementations.

FIGS. 11 and 12 are similar to FIGS. 9 and 10. However, in the embodiments of FIGS. 11 and 12, demodulation metric values are computed for each combination of the possible modulation constellations and the possible symbol vectors. More specifically, FIG. 11 is a flow chart that illustrates the operation of the demodulator 16 of FIG. 1 to output a number of demodulated symbols transmitted in a particular channel use when the modulation of the non-constant envelope modulated interfering signal is unknown according to another embodiment of the present disclosure. In general, the process of FIG. 9 implements Equations (18) and (19) above.

First, the demodulator 16 hypothesizes a new modulation constellation from the set of all possible modulation constellations $\Gamma \equiv \{\Lambda_{I,1}, \Lambda_{I,2}, \ldots, \Lambda_{I,n_C}\}$ for the interfering signal (step 700). The demodulator 16 also hypothesizes a new vector of transmitted symbols, referred to as symbol vector s, from the set of all possible symbol vectors $s=[s_1, s_2, \ldots s_{n_s}]^T \epsilon (\Lambda_D)^{n_s}$ (step 702). Next, using the hypothesized modulation constellation and the hypothesized symbol vector, the demodulator 16 computes a value (i.e., a demodulation metric value) for the demodulation metric ($m_{new}$) that models the non-constant envelope modulated interfering signal as a stationary non-Gaussian random process with a marginal probability distribution for the hypothesized modulation constellation of a modulation used for the non-constant envelope modulated interfering signal (step 704). In one embodiment, the demodulation metric value is computed based on Equation (6) above. However, as discussed below, the present disclosure is not limited thereto.

In this embodiment, the demodulator 16 then determines whether the demodulation metric value computed in step 704 is better than a current best demodulation metric value (step 706). Initially, the current best demodulation metric value is some initial, or default, value such as, for example, a maximum possible value for the demodulation metric. In this embodiment, the demodulation metric value computed in step 704 is better than the current best demodulation metric value if the demodulation metric value is less than the current best demodulation metric value. If the demodulation metric value computed in step 704 is not better than the current best demodulation metric value, the process proceeds to step 710. However, if the demodulation metric value is better than the current best demodulation metric value, then the demodulator 16 stores the demodulation metric value as the current best demodulation metric value (step 708).

Next, whether proceeding from step 706 or 708, the demodulator 16 determines whether all possible symbol vectors have been hypothesized (step 710). If not, the process returns to step 702 and is repeated until all symbol vectors have been hypothesized. Once all symbol vectors have been hypothesized, the demodulator 16 determines whether all modulation constellations have been hypothesized (step 712). If not, the process returns to step 700 and is repeated until all possible modulation constellations have been hypothesized. Once all possible modulation constellations have been hypothesized, the demodulator 16 has computed demodulation metric values for each possible modulation constellation and symbol vector combination. The demodulator 16 then outputs the hypothesized symbol vector corresponding to the best demodulation metric value among all of the demodulation metric values computed in steps 700 through 712 as a demodulated symbol vector according to Equations (18) and (19) (step 714). The demodulated symbol vector includes the number $n_S$ symbols transmitted in the desired signal at this particular channel use.

FIG. 12 is a flow chart that illustrates the operation of the demodulator 16 of FIG. 1 to output soft bit information for each bit of each symbol transmitted in a particular channel use when the modulation of the non-constant envelope modulated interfering signal is unknown according to another embodiment of the present disclosure. In general, the process of FIG. 12 implements Equation (20) above. First, the demodulator 16 hypothesizes a new modulation constellation from the set of all possible modulation constellations $\Gamma \equiv \{\Lambda_{I,1}, \Lambda_{I,2}, \ldots, \Lambda_{I,n_C}\}$ for the interfering signal (step 800). The demodulator 16 also hypothesizes a new vector of transmitted symbols, referred to as symbol vector s, from the set of all possible symbol vectors $s = [s_1, s_2, \ldots s_{n_S}]^T \in (\Lambda_D)^{n_S}$ (step 802). Next, using the hypothesized modulation constellation and the hypothesized symbol vector, the demodulator 16 computes a value (i.e., a demodulation metric value) for the demodulation metric ($m_{new}$) that models the non-constant envelope modulated interfering signal as a stationary non-Gaussian random process with a marginal probability distribution for the hypothesized modulation constellation of a modulation used for the non-constant envelope modulated interfering signal (step 804). In one embodiment, the demodulation metric value is computed based on Equation (6) above. However, as discussed below, the present disclosure is not limited thereto.

In this embodiment, the demodulator 16 then determines whether all possible symbol vectors have been hypothesized (step 806). If not, the process returns to step 802 and is repeated until all symbol vectors have been hypothesized. Once all symbol vectors have been hypothesized, the demodulator 16 determines whether all modulation constellations have been hypothesized (step 808). If not, the process returns to step 800 and is repeated until all possible modulation constellations have been hypothesized. Once all possible modulation constellations have been hypothesized, the demodulator 16 has computed demodulation metric values for each possible modulation constellation and symbol vector combination. The demodulator 16 then identifies a best modulation constellation based on the computed demodulation metric values (step 810). More specifically, the best modulation constellation is computed based on Equation (18). The demodulator 16 then computes soft bit information for each bit of each symbol transmitted in symbol vector s based on the demodulation metric values computed for the hypothesized symbol vectors for the best modulation constellation (step 812). More specifically, the soft bit information is preferably computed based on Equation (20). The demodulator 16 then outputs the soft bit information (step 814).

All of the embodiments described above are for a scenario where the non-constant envelope modulated interfering signal is a single stream. However, the processes described above can be extended for a scenario where the non-constant envelope modulated interfering signal includes multiple streams. Before proceeding, it should be noted that the embodiments above may be used even in a multi-stream interfering signal scenario to address a most dominant stream of the multi-stream interfering signal. For the multi-stream interfering signal scenario, the baseband received signal can be modeled as:

$$r = Hs + \underbrace{(H_I s_I + n)}_{v},$$

where $$s_I = [s_1, s_2, \ldots, s_{n_{S_I}}]^T \in \Lambda_I$$

is a vector of $n_{S_I}$ desired symbols, and $H_I$ denotes an $n_R$-by-$n_{S_I}$ effective MIMO channel matrix of the interfering signal. The probability density function of v is given by:

$$p_{v[i]}(v) = \frac{1}{\pi^N \det(R)} \sum_{s \in (\Lambda_I)^{n_{S_I}}} p_{s_I}(s) \exp\{-(v - H_I s)^H R^{-1}(v - H_I s)\}.$$

It follows that the Minimum-Likelihood demodulation metric is given by:

$$m_{new}(s \mid r, R, H, h_I) \equiv -\ln p_v(r - Hs)$$
$$= m_{conv}(s \mid r, R, H) + \Delta_{\Lambda_I}(s \mid r, R, H, h_I),$$

where:

$$\Delta_{\Lambda_I}(s \mid r, R, H, H_I) \equiv$$
$$-\ln\left(\sum_{t \in (\Lambda_I)^{n_{S_I}}} p_{s_I}(t) e^{-t^H H_I^H R^{-1} H_I t} \exp\{2\text{Re}\{(r - Hs)^H R^{-1} h_I t\}\}\right)$$

and $p_{s_I}(s)$ denotes the probability mass function of the symbol vector $s_I$ of the interfering signal. If it is assumed that the probability distribution of the symbol vector $s_I$ of the interfering signal is equally likely in $\Lambda_I$, i.e. $p_{s_I}(s) \equiv 1/|\Lambda_I|^{n_{s_I}}$, where |S| denotes the cardinality of the set S, the metric correction $\Delta(s|r, R, H, H_I)$ can be expressed as:

$$\Delta_{\Lambda_I}(s|r, R, H, H_I) \equiv -\ln\left(\sum_{t \in (\Lambda_I)^{n_{s_I}}} e^{-t^H H_I^H R^{-1} H_I t} \exp\{2\mathrm{Re}\{(r-Hs)^H R^{-1} H_I t\}\}\right) + \ln|\Lambda_I|$$

$$= -\ln\left(\sum_{t \in (\Lambda_I)^{n_{s_I}} : t_1 \in \Lambda_I \cap C^+} e^{-t^H H_I^H R^{-1} H_I t} \begin{bmatrix} \cosh\{2\mathrm{Re}\{(r-Hs)^H R^{-1} H_I t\}\} + \\ \cosh\{2\mathrm{Im}\{(r-Hs)^H R^{-1} H_I t\}\} \end{bmatrix}\right) + \ln(|\Lambda_I|/2),$$

where $$t \equiv [t_1, t_2, \ldots, t_{n_{s_I}}]^T.$$

The last term of the above equation is independent of the symbol vector s and can therefore be ignored. Note that the correction term $\Delta(s|r, R, H, H_I)$ shown above depends on the symbol vector s and the received signal vector r only through the WRIP for multiple streams given by $(r-Hs)^H R^{-1} H_I$.

The following acronyms are used throughout this disclosure.

| | |
|---|---|
| 8PSK | 8-Phase Shift Keying |
| ASIC | Application Specific Integrated Circuit |
| DSP | Digital Signal Processor |
| GMSK | Gaussian Minimum Shift Keying |
| GSM | Global System for Mobile Communications |
| HSPA | High Speed Packet Access |
| LTE | Long Term Evolution |
| MCS | Modulation-Coding Scheme |
| MIMO | Multiple Input Multiple Output |
| ML | Maximun-Likelihood |
| OFDM | Orthogonal Frequency-Division Multiplexing |
| QAM | Quadrature Amplitude Modulation |
| QPSK | Quadrature Phase Shift Keying |
| SIMO | Single Input Multiple Output |
| WRIP | Whitened Residual-Interference Product |

Those skilled in the art will recognize improvements and modifications to the preferred embodiments of the present disclosure. All such improvements and modifications are considered within the scope of the concepts disclosed herein and the claims that follow.

What is claimed is:

1. A receiver comprising:
   a downconverter configured to receive a radio frequency signal comprising a desired signal, noise, and a non-constant envelope modulated interfering signal, and downconvert the radio frequency signal to provide a downconverted signal; and
   a demodulator configured to demodulate the downconverted signal based on a demodulation metric that models the non-constant envelope modulated interfering signal as a stationary non-Gaussian random process with a probability distribution derived from a modulation constellation of a modulation used for the non-constant envelope modulated interfering signal.

2. The receiver of claim 1 wherein the demodulator is further configured to output demodulated symbols.

3. The receiver of claim 1 wherein the demodulator is further configured to output soft bit information.

4. The receiver of claim 1 wherein for a channel use of the desired signal, the demodulator is configured to:
   compute, for a plurality of hypothesized symbol vectors, a plurality of demodulation metric values for the demodulation metric that models the non-constant envelope modulated interfering signal as the stationary non-Gaussian random process with the probability distribution derived from the modulation constellation of the modulation used for the non-constant envelope modulated interfering signal, each demodulation metric value of the plurality of demodulation metric values corresponding to a different one of the plurality of hypothesized symbol vectors.

5. The receiver of claim 4 wherein the desired signal is an Orthogonal Frequency Division Multiplexing signal, and the channel use is a particular subcarrier in a particular time slot of the desired signal.

6. The receiver of claim 4 wherein the demodulator is further configured to output one of the plurality of hypothesized symbol vectors having a best demodulation metric value of the plurality of demodulation metric values as a demodulated symbol vector for the desired signal for the channel use.

7. The receiver of claim 4 wherein the demodulator is further configured to:
   compute soft bit information for each bit of each symbol for the channel use based on the plurality of demodulation metric values for the plurality of hypothesized symbol vectors; and
   output the soft bit information.

8. The receiver of claim 4 wherein, in order to compute the plurality of demodulation metric values, the demodulator is further configured to, for each hypothesized symbol vector of the plurality of hypothesized symbol vectors:
   compute, for the hypothesized symbol vector, a conventional demodulation metric value for a conventional demodulation metric that models the noise as a stationary Gaussian noise with a Gaussian probability distribution;
   compute a metric correction value for the hypothesized symbol vector that represents a difference between the conventional demodulation metric and the demodulation metric that models the non-constant envelope modulated interfering signal as the stationary non-Gaussian random process with the probability distribution derived from the modulation constellation of the modulation used for the non-constant envelope modulated interfering signal; and
   sum the conventional demodulation metric value for the hypothesized symbol vector and the metric correction value for the hypothesized symbol vector to provide the demodulation metric value for the hypothesized symbol vector.

9. The receiver of claim 8 wherein in order to compute the metric correction value for the hypothesized symbol vector, the demodulator is further configured to:

compute an overwhitened interfering channel value;
compute a residual signal value;
compute a whitened residual-interference product value as a product of the overwhitened interfering channel value and the residual signal value; and
compute the metric correction value as a nonlinear function of the whitened residual-interference product value.

10. The receiver of claim 8 wherein in order to compute the metric correction value for the hypothesized symbol vector, the demodulator is further configured to:
compute a whitened residual-interference product value defined as:

$$(r-Hs)^H R^{-1} h_1,$$

where r is a signal vector received at a particular channel use through a number of receive antennas, H is an effective channel matrix, s is the hypothesized symbol vector, R is an impairment covariance matrix, and $h_1$ is a channel vector for a channel of the non-constant envelope modulated interfering signal where the non-constant envelope modulated interfering signal is a single stream; and
compute the metric correction value for the hypothesized symbol vector as a nonlinear function of the whitened residual-interference product value.

11. The receiver of claim 4 wherein, in order to compute the plurality of demodulation metric values, the demodulator is further configured to, for each hypothesized symbol vector of the plurality of hypothesized symbol vectors:
compute the demodulation metric value for the hypothesized symbol vector based on:

$$m_{new}(s \mid r, R, H, h_I) = m_{conv}(s \mid r, R, H) + \Delta_{\Lambda_I}(s \mid r, R, H, h_I),$$

where $$m_{conv}(s \mid r, R, H) = (r - Hs)^H R^{-1}(r - Hs),$$

and $$\Delta_{\Lambda_I}(s \mid r, R, H, h_I) = -\ln\left(\sum_{t \in \Lambda_I} p_{s_I}(t)\exp\{2\mathrm{Re}\{(r - Hs)^H R^{-1} h_I t\}\}\right) + h_I^H R^{-1} h_I,$$

where $m_{new}$ is the demodulation metric, r is a signal vector defined as $r=(r_1, r_2, \ldots r_{n_R})$ that represents the desired signal for the channel use received through $n_R$ receive antennas, s is the hypothesized symbol vector defined as $s=[s_1, s_2, \ldots s_{n_R}]^T \epsilon (\Lambda_D)^{n_s}$ of $n_s$ streams of desired symbols, R is an impairment covariance matrix, H is an effective channel matrix, $h_1$ is a channel vector for a channel of the non-constant envelope modulated interfering signal where the non-constant envelope modulated interfering signal is a single stream, $\Lambda_1$ is a set of points in the modulation constellation for the modulation used for the non-constant envelope modulated interfering signal, $\Lambda_A$, is a metric correction value, and $p_{s_I}(t)$ is a probability that a symbol $s_1$ from the non-constant envelope modulated interfering signal is equal to a value $t \epsilon \Lambda_1$.

12. The receiver of claim 4 wherein the demodulation metric is based on an approximation of the modulation constellation of the modulation used for the non-constant envelope modulated interfering signal as a plurality of modulation constellations of two or more modulation types.

13. The receiver of claim 4 wherein the modulation used for the non-constant envelope modulated interfering signal is an M-ary Quadrature Amplitude Modulation with $M=2^B$ where B is an integer greater than or equal to 2, and the demodulation metric is based on an approximation of the modulation constellation of the modulation used for the non-constant envelope modulated interfering signal as one or more Quadrature Phase Shift Keying constellations and one or more rotated 8-Phase Shift Keying constellations.

14. The receiver of claim 4 wherein the demodulation metric is based on an approximation of a plurality of discrete constellation points that form the modulation constellation of the modulation used for the non-constant envelope modulated interfering signal as a continuous region.

15. The receiver of claim 4 wherein, in order to compute the plurality of demodulation metric values, the demodulator is further configured to, for each hypothesized symbol vector of the plurality of hypothesized symbol vectors:
compute, for the hypothesized symbol vector, a conventional demodulation metric value for a conventional demodulation metric that models the noise as a stationary Gaussian noise with a Gaussian probability distribution;
compute a plurality of metric correction values for a plurality of hypothesized modulation constellations for the modulation used for the non-constant envelope modulated interfering signal, each metric correction value of the plurality of metric correction values corresponding to a different one of the plurality of hypothesized modulation constellations and representing a difference between the conventional demodulation metric and the demodulation metric that models the non-constant envelope modulated interfering signal as the stationary non-Gaussian random process with the probability distribution derived from the hypothesized modulation constellation for the modulation used for the non-constant envelope modulated interfering signal; and
sum the conventional demodulation metric value for the hypothesized symbol vector and a best metric correction value of the plurality of metric correction values to provide the demodulation metric value for the hypothesized symbol vector.

16. The receiver of claim 1 wherein for a channel use of the desired signal, the demodulator is configured to:
compute, for a plurality of hypothesized symbol vectors and a plurality of hypothesized modulation constellations for the modulation used for the non-constant envelope modulated interfering signal, a plurality of demodulation metric values for the demodulation metric that models the non-constant envelope modulated interfering signal as the stationary non-Gaussian random process with the probability distribution derived from the modulation constellation of the modulation used for the non-constant envelope modulated interfering signal, each demodulation metric value of the plurality of demodulation metric values corresponding to a different combination of one the plurality of hypothesized symbol vectors and one of the plurality of hypothesized modulation constellations for the modulation used for the non-constant envelope modulated interfering signal; and
output one of the plurality of hypothesized symbol vectors that corresponds to a best modulation metric value of the plurality of demodulation metric values as a demodulated symbol vector for the desired signal for the channel use.

17. The receiver of claim 1 wherein for a channel use of the desired signal, the demodulator is configured to:
compute, for a plurality of hypothesized symbol vectors and a plurality of hypothesized modulation constellations for the modulation used for the non-constant envelope modulated interfering signal, a plurality of demodulation metric values for the demodulation metric that models the non-constant envelope modulated interfering signal as the stationary non-Gaussian random process with the probability distribution derived from the modulation constellation of the modulation used for the non-constant envelope modulated interfering signal, each demodulation metric value of the plurality of demodulation metric values corresponding to a different combination of one the plurality of hypothesized symbol vectors and one of the plurality of hypothesized modulation constellations for the modulation used for the non-constant envelope modulated interfering signal;

identify a best hypothesized modulation constellation of the plurality of hypothesized modulation constellations based on the plurality of demodulation metric values;

compute soft bit information for each bit of each symbol for the channel use based on a subset of the plurality of demodulation metric values for the plurality of hypothesized symbol vectors for the best hypothesized modulation constellation; and output the soft bit information.

18. The receiver of claim 1 wherein the non-constant envelope modulated interfering signal includes a single stream.

19. The receiver of claim 1 wherein the non-constant envelope modulated interfering signal includes multiple streams.

20. A method of operation of a receiver comprising:
receiving a radio frequency signal comprising a desired signal, noise, and a non-constant envelope modulated interfering signal;
downconverting the radio frequency signal to provide a downconverted signal; and
demodulating the downconverted signal based on a demodulation metric that models the non-constant envelope modulated interfering signal as a stationary non-Gaussian random process with a probability distribution derived from a modulation constellation of a modulation used for the non-constant envelope modulated interfering signal.

* * * * *